United States Patent
Shen et al.

(10) Patent No.: US 11,864,140 B2
(45) Date of Patent: Jan. 2, 2024

(54) METHODS AND SYSTEMS FOR TIME SYNCHRONIZATION AMONG UNMANNED AERIAL SYSTEMS

(71) Applicant: Intelligent Fusion Technology, Inc., Germantown, MD (US)

(72) Inventors: Dan Shen, Germantown, MD (US); Genshe Chen, Germantown, MD (US); Khanh Pham, Kirtland AFB, NM (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 53 days.

(21) Appl. No.: 17/579,348

(22) Filed: Jan. 19, 2022

(65) Prior Publication Data
US 2023/0232350 A1 Jul. 20, 2023

(51) Int. Cl.
*H04W 56/00* (2009.01)
*H04B 7/026* (2017.01)
*B64C 39/02* (2023.01)

(52) U.S. Cl.
CPC ....... *H04W 56/0015* (2013.01); *B64C 39/024* (2013.01); *H04B 7/026* (2013.01)

(58) Field of Classification Search
None
See application file for complete search history.

(56) References Cited

U.S. PATENT DOCUMENTS

| | | | |
|---|---|---|---|
| 7,305,704 B2* | 12/2007 | Ofek | H04L 69/16 713/168 |
| 7,327,699 B1* | 2/2008 | Schafer | G04R 20/02 370/324 |

(Continued)

FOREIGN PATENT DOCUMENTS

| | | | |
|---|---|---|---|
| CA | 3133977 A1 * | 10/2020 | H04B 1/692 |
| CN | 102540867 A * | 7/2012 | |

(Continued)

OTHER PUBLICATIONS

D. Shen, G. Chen, K. Pham and E. Blasch, "Enhanced Multi-Way Time Transfer for High-Precision Time Synchronization among UASs," MILCOM 2022—2022 IEEE Military Communications Conference (MILCOM), Rockville, MD, USA, 2022, pp. 1-6, doi: 10.1109/MILCOM55135.2022.10017881. (Year: 2022).*

(Continued)

*Primary Examiner* — Berhanu Tadese
(74) *Attorney, Agent, or Firm* — ANOVA LAW GROUP, PLLC

(57) ABSTRACT

A system and method are provided for enhanced multi-way time transfer for time synchronization between at least one slave node and one master node. A slave node sends a first message to the master node to launch a time synchronization between the slave node and the master node. Upon receiving the first message, the master node adds a receiving time on a master clock to the first message to form a second message. The master node sends the second message back to the slave node and the slave node adds a receiving time on the slave clock to the second message to form an updated message. The slave node performs a time adjustment to the slave clock based on the updated message, thereby synchronizing time between the slave node and the master node.

20 Claims, 17 Drawing Sheets

(56) References Cited

U.S. PATENT DOCUMENTS

| | | | | |
|---|---|---|---|---|
| 7,343,619 | B2* | 3/2008 | Ofek | H04L 47/193 |
| | | | | 709/225 |
| 7,367,045 | B2* | 4/2008 | Ofek | H04L 47/27 |
| | | | | 709/224 |
| 7,398,398 | B2* | 7/2008 | Ofek | G06F 21/14 |
| | | | | 713/180 |
| 7,509,687 | B2* | 3/2009 | Ofek | G06F 21/14 |
| | | | | 709/227 |
| 7,895,643 | B2* | 2/2011 | Yung | H04L 69/163 |
| | | | | 717/126 |
| 8,493,123 | B2* | 7/2013 | Wilkinson | G04G 7/00 |
| | | | | 359/333 |
| 8,600,239 | B2* | 12/2013 | Mani | H04J 14/0272 |
| | | | | 398/154 |
| 8,800,032 | B2* | 8/2014 | Yung | H04L 47/10 |
| | | | | 717/126 |
| 9,160,473 | B2* | 10/2015 | Mani | H04J 3/0667 |
| 9,481,459 | B2* | 11/2016 | Staskevich | B60L 53/38 |
| 9,537,576 | B2* | 1/2017 | Wu | H04L 25/00 |
| 9,778,368 | B2* | 10/2017 | Krantz | H01Q 9/28 |
| 10,211,969 | B1* | 2/2019 | Littlepage | H04L 45/24 |
| 10,291,347 | B2* | 5/2019 | Wang | H04B 1/715 |
| 10,338,207 | B2* | 7/2019 | Wang | G01S 13/34 |
| 10,389,514 | B2* | 8/2019 | Sinclair | H04B 10/112 |
| 10,775,749 | B2* | 9/2020 | Dunn | G04R 20/02 |
| 10,790,872 | B1* | 9/2020 | Blanchard | H04B 1/692 |
| 10,805,924 | B2* | 10/2020 | Ginde | H04W 72/044 |
| 11,050,458 | B2* | 6/2021 | Blanchard | H04B 7/12 |
| 11,082,083 | B2* | 8/2021 | Blanchard | H04B 1/715 |
| 11,082,084 | B2* | 8/2021 | Blanchard | H04L 1/0061 |
| 11,146,334 | B2* | 10/2021 | Wu | H04B 10/2589 |
| 11,175,634 | B2* | 11/2021 | Dunn | G04G 7/00 |
| 11,228,338 | B2* | 1/2022 | Blanchard | H04B 7/0857 |
| 11,310,754 | B2* | 4/2022 | Kim | H04W 56/0015 |
| 11,346,957 | B2* | 5/2022 | Reis | G01S 19/00 |
| 11,493,636 | B2* | 11/2022 | Camparo | H04B 7/18521 |
| 11,509,451 | B1* | 11/2022 | Pham | H04L 7/0331 |
| 11,552,673 | B2* | 1/2023 | Blanchard | H04B 7/0857 |
| 11,638,153 | B2* | 4/2023 | Reis | H04W 12/122 |
| | | | | 342/352 |
| 2016/0251081 | A1* | 9/2016 | Staskevich | B64F 1/20 |
| | | | | 701/2 |
| 2018/0329047 | A1* | 11/2018 | Wang | G01S 13/34 |
| 2021/0018878 | A1* | 1/2021 | Dunn | G04R 20/02 |
| 2021/0075100 | A1* | 3/2021 | Kwon | H04B 7/0845 |
| 2021/0311199 | A1* | 10/2021 | Reis | G01S 19/00 |
| 2021/0311201 | A1* | 10/2021 | Reis | G01S 19/38 |
| 2021/0311202 | A1* | 10/2021 | Reis | G01S 19/00 |
| 2021/0311203 | A1* | 10/2021 | Reis | G01S 19/00 |

FOREIGN PATENT DOCUMENTS

| | | | | |
|---|---|---|---|---|
| CN | 102624513 | A | * | 8/2012 |
| CN | 102833025 | A | * | 12/2012 |
| CN | 103718059 | A | * | 4/2014 | G01S 1/024 |
| CN | 104765047 | A | * | 7/2015 | G04R 20/02 |
| CN | 105954765 | A | * | 9/2016 | G01S 1/024 |
| CN | 106324623 | A | * | 1/2017 | G01S 1/024 |
| CN | 104765047 | B | * | 5/2017 | G04R 20/02 |
| CN | 109257097 | A | * | 1/2019 | H04B 10/0775 |
| CN | 110336612 | A | * | 10/2019 | H04B 10/25755 |
| CN | 110518960 | A | * | 11/2019 | H04B 7/18517 |
| CN | 110865532 | A | * | 3/2020 | G04R 20/02 |
| CN | 112422166 | A | * | 2/2021 | H04B 7/18513 |
| CN | 112532309 | A | * | 3/2021 | H04B 7/18519 |
| CN | 109257097 | B | * | 8/2021 | H04B 10/0775 |
| CN | 113422638 | A | * | 9/2021 | |
| CN | 113810248 | A | * | 12/2021 | |
| CN | 112422166 | B | * | 4/2022 | H04B 7/18513 |
| CN | 115308781 | A | * | 11/2022 | |
| DE | 19914355 | A1 | * | 10/2000 | G04R 20/02 |
| DE | 69935775 | T2 | * | 12/2007 | H04J 3/0658 |
| DE | 102021122192 | A1 | * | 3/2023 | |
| EP | 1183573 | A1 | * | 3/2002 | G04R 20/02 |
| EP | 1173798 | B1 | * | 6/2006 | G04G 7/02 |
| EP | 1004189 | B1 | * | 4/2007 | H04J 3/0658 |
| EP | 2386875 | A1 | * | 11/2011 | B64G 3/00 |
| EP | 2652565 | B1 | * | 11/2014 | G04G 7/00 |
| EP | 2799941 | A2 | * | 11/2014 | G04G 7/00 |
| EP | 2799942 | A2 | * | 11/2014 | G04G 7/00 |
| EP | 2799943 | A2 | * | 11/2014 | G04G 7/00 |
| EP | 2799941 | B1 | * | 7/2016 | G04G 7/00 |
| EP | 2799942 | B1 | * | 8/2016 | G04G 7/00 |
| EP | 1183573 | B1 | * | 9/2016 | G04R 20/02 |
| EP | 2799943 | B1 | * | 9/2016 | G04G 7/00 |
| EP | 3714644 | B1 | * | 4/2022 | H04B 7/18513 |
| ES | 2606366 | T3 | * | 3/2017 | G04R 20/02 |
| FR | 2959571 | A1 | * | 11/2011 | B64G 3/00 |
| GB | 2607486 | A | * | 12/2022 | H04B 1/692 |
| JP | 2008122290 | A | * | 5/2008 | |
| JP | 4868516 | B2 | * | 2/2012 | |
| JP | 2012129987 | A | * | 7/2012 | G04G 7/00 |
| JP | 5425870 | B2 | * | 2/2014 | G04G 7/00 |
| WO | WO-0060420 | A1 | * | 10/2000 | G04R 20/02 |
| WO | WO-2012082508 | A1 | * | 6/2012 | G04G 7/00 |
| WO | WO-2016036617 | A1 | * | 3/2016 | G01S 19/32 |
| WO | WO-2019098898 | A1 | * | 5/2019 | H04B 7/18513 |
| WO | WO-2021058816 | A1 | * | 4/2021 | H04B 7/18504 |
| WO | WO-2022175226 | A1 | * | 8/2022 | |

OTHER PUBLICATIONS

Y. Xuhai, Li Zhigang, W. Fenglei and Li Xiaohui, "Two-Way Satellite Time and Frequency Transfer Experiment via IGSO Satellite," 2007 IEEE International Frequency Control Symposium Joint with the 21st European Frequency and Time Forum, Geneva, Switzerland, 2007, pp. 1206-1209 (Year: 2007).*

Y. Xuhai, Li Zhigang and H. Aihui, "Analysis of Two-Way Satellite Time and Frequency Transfer with C-Band," 2007 IEEE International Frequency Control Symposium Joint with the 21st European Frequency and Time Forum, Geneva, Switzerland, 2007, pp. 901-903, doi: 10.1109/FREQ.2007.4319209. (Year: 2007).*

Hou et al., Quantum-enhanced Two-way Time Transfer, Quantum Information and Measurement (QIM), 2017 (Year: 2017).*

D. W. Hanson, Fundamentals of Two-Way Time Transfer by Satellite, 43rd Annual Frequency Control Symposium, pp. 174-178, 1989. (Year: 1989).*

WO2020062177 (Machine Translated Using Wipo- ) Time Synchronization Method and Device, Unmanned Aerial Vehicle, Remote Control, and Storage Medium, Published Feb. 4, 2020 (Year: 2020).*

D. Lyu et al. Enhancing Multi-GNSS Time and Frquency Transfer using a refined stochastic model of a receiver clock, Measurement Science and Technology, Sep. 2019 (Year: 2019).*

D. W. Hanson, Fundamentals of two-way time transfers by satellit—Frequency Control, 1989. (Year: 1989).*

Hou et al., Quantum-enhanced Two-way Time Transfer, QIM 2017 (Year: 2017).*

Shen et al., Enhanced Multi-Way Time Transfer for High-Precision Time Synchronization among UASs, IEEE 2022 (Year: 2022).*

Two-Way Satellite Time and Frequency Transfer (TWSTFT), National Institute of Standards and Technology (NIST), Dec. 2021 (Year: 2021).*

Wang et al., Filtering Method in SDR Two-way Satellite Time and Frequency Transfer (TWSTFT), IEEE 2021 (Year: 2021).*

Xuhai et al. Two-Way Satellite Time and Frequency Transfer via IGSO Satellite, IEEE 2007 (Year: 2007).*

Xuhai et al. Analysis of Two-Way Satellite Time and Frequency Transfer with C-Band, IEEE 2007 (Year: 2007).*

* cited by examiner

METHODS AND SYSTEMS FOR TIME SYNCHRONIZATION AMONG UNMANNED AERIAL SYSTEMS

GOVERNMENT RIGHTS

This invention was made with Government support under Contract No. N68335-19-C-0948, awarded by the United States Naval Air Warfare Center. The U.S. Government has certain rights in this invention.

DESCRIPTION OF THE DISCLOSURE

The present disclosure relates generally to the field of unmanned aerial systems and, more particularly, relates to methods and systems for time synchronization among unmanned aerial systems.

BACKGROUND

Small unmanned aerial systems (UASs) are emerging for surveillance, air package transport, and emergency communication. With the increasing use of small UASs, it is desired to equip them with radio frequency (RF) sensors/payloads to permit them to work together. Precise time synchronization among UASs is essential for coordinated control. Existing techniques for time synchronization among UASs rely on either the use of global positioning system (GPS) or an embedded signal from the target in order to time synchronize multiple UASs. In the absence of GPS or cooperative targets, development of a solution to the time synchronization problem for multiple spatially dispersed UASs is needed.

Two-way time transfer (TWTT) is capable of dynamic adjustment of clocks based on offsets between local clocks and remote clocks. However, to obtain high-precision time synchronization, standard TWTT requires: (i) the time at which the time-based signal is transmitted is the same for both Transmit (TX) and Receive (RX) sides, and (ii) the propagation delay of the time signal must be the same in the both ways. Both conditions are difficult to meet in UAS-based distributed cooperative beamforming (DCB) missions.

Thus, there is a need to overcome these and other problems of the prior art and to provide methods and systems for enhanced multi-way time transfer for high-precision time synchronization among UASs.

BRIEF SUMMARY OF THE DISCLOSURE

One aspect or embodiment of the present disclosure includes a system. The system includes at least one slave node each including an unmanned aerial system (UAS), and one master node including one UAS. The at least one slave node and the one master node are configured to execute instructions for a method of enhanced multi-way time transfer for time synchronization between the at least one slave node and the master node. The method includes: sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message; upon receiving the first message, adding, by the master node, a receiving time of receiving the first message on a master clock of the master node to the first message to form a second message, the master node calculating a Receive (RX) processing time of the first message; sending, by the master node, the second message back to the slave node, the second message including a start time of sending the second message on the master clock of the master node, and the master node calculating a TX processing time of the second message; adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node. The slave node calculates a first distance between the slave node and the master node at the start time of sending the first message, and a second distance between the slave node and the master node at the start time of sending the second message, and the time adjustment is determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

Another aspect or embodiment of the present disclosure includes a computer-implemented method for enhanced multi-way time transfer for time synchronization between at least one slave nodes and one master node. The method is implemented in a system. The system includes the at least one slave node each including an unmanned aerial system (UAS) and the one master node including one UAS. The method includes: sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message; upon receiving the first message, adding, by the master node, a receiving time of receiving the first message on a master clock of the master node to the first message to form a second message, the master node calculating a Receive (RX) processing time of the first message; sending, by the master node, the second message back to the slave node, the second message including a start time of sending the second message on the master clock of the master node, and the master node calculating a TX processing time of the second message; adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node. The slave node calculates a first distance between the slave node and the master node at the start time of sending the first message, and a second distance between the slave node and the master node at the start time of sending the second message, and the time adjustment is determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

Another aspect or embodiment of the present disclosure includes a non-transitory computer readable storage medium storing instructions that, when executed by one or more processors, cause the one or more processors to perform a method for enhanced multi-way time transfer for time synchronization between at least one slave node and one master node. The method is implemented in a system including the at least one slave node each including an unmanned aerial system (UAS) and the one master node including one UAS. The method includes: sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message; upon receiving the first message, adding, by the master node, a receiving time of receiving the first message on a master clock of the master node to the first message to form a second message, the master node calculating a Receive (RX) processing time of the first message; sending, by the master node, the second message back to the slave node, the second message including a start time of sending the second message on the master clock of the master node, and the master node calculating a TX processing time of the second message; adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node. The slave node calculates a first distance between the slave node and the master node at the start time of sending the first message, and a second distance between the slave node and the master node at the start time of sending the second message, and the time adjustment is determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

Another aspect or embodiment of the present disclosure includes an event-driven simulation method of enhanced multi-way time transfer for time synchronization between at least one slave node and one master node, wherein the method is implemented in a system comprising the at least one slave node each comprising an unmanned aerial system (UAS) and the one master node comprising one UAS. The event-driven simulation method includes: performing a first event, by one slave node of the at least one slave node, to launch an enhanced two-way time transfer every one millisecond at a local clock of the one slave node; performing a second event, by the one slave node, to send a first message to the master node to launch a time synchronization between the one slave node and the master node, the first message including a start time of sending the first message on the local clock of the one slave node, and the one slave node calculating a Transmit (TX) processing time of the first message; performing a third event, by the master node, to receive the first message through an antenna of the master node; performing a fourth event, by the master node, to add a receiving time of receiving the first message on a master clock of the master node to the first message to form a second message, the master node calculating a Receive (RX) processing time of the first message; performing a fifth event, by the master node, to send the second message back to the one slave node, the second message including a start time of sending the second message on the master clock of the master node, and the master node calculating a TX processing time of the second message; performing a sixth event, by the one slave node, to receive the second message through an antenna of the one slave node; and performing a seventh event, by the one slave node, to add a receiving time of receiving the second message on the local clock of the one slave node to the second message to form an updated message, the one slave node calculating a RX processing time of the second message; and to perform a time adjustment to the local clock of the one slave node based on the updated message, thereby synchronizing time between the local clock of the one slave node and the master clock of the master node, wherein the one slave node calculates a first distance between the one slave node and the master node at the start time of sending the first message, and a second distance between the one slave node and the master node at the start time of sending the second message, and the time adjustment is determined by the one slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

As described, small unmanned aerial systems (UASs) have found many applications within both the defense and commercial sectors. With the increasing availability of small UASs, it is desired to permit them to work together with radio frequency (RF) sensors/payloads to form a coherent beam on an area of interest (AOI). In order to facilitate multi-UAS control, a precise time synchronization among the UASs is essential. In the present disclosure, a framework of enhanced two-way time transfer (TWTT) has been developed to achieve high-precision (e.g., about 100 pico-seconds) time synchronization of multiple distributed RF sources located on UASs in a GPS-denied environment. The disclosed enhanced multi-way time transfer (EM-WaTT) can relax two conditions associated with traditional TWTT: (i) the time at which the time-based signal is transmitted is the same for both Transmit (TX) and Receive (RX) sides, and (ii) the propagation delay of the time signal must be the same in both directions. Event-driven numerical simulations have been implemented and analyzed. Desired results have been obtained on a scenario of 10 UASs randomly located in a one square mile area.

The disclosed enhanced TWTT follows the basic premise of standard TWTT and relaxes the two conditions. Furthermore, for many UASs, a pairwise approach based on the enhanced TWTT would then enable an EM-WaTT method and system for time-coordinated action. The present disclosure will next describe the enhanced TWTT mechanism, which is followed by an event-driven simulation method for EM-WaTT. The present disclosure will then provide numerical scenarios that are simulated and analyzed to illustrate the EM-WaTT.

Figure 1:
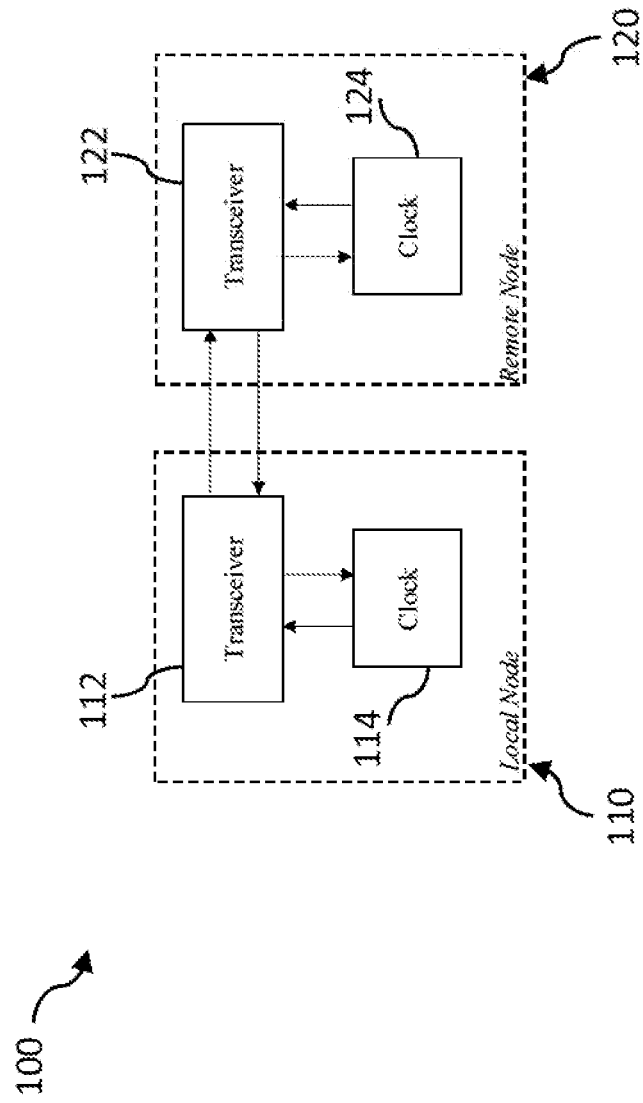
FIG. 1 illustrates a schematic diagram of an existing/standard TWTT, according to one embodiment of the present disclosure.

Since the EM-WaTT disclosed herein is based on the standard/existing TWTT, key elements of the standard/existing TWTT are briefly presented herein with more details of the standard/existing TWTT known to a person skilled in the art. FIG. 1 illustrates a schematic diagram of an existing/standard TWTT 100 according to one embodiment of the present disclosure. The basic premise of the existing/standard TWTT 100 is depicted in FIG. 1, where clock information is exchanged between a local node 110 and a remote node 120. The local node 110 may comprise a transceiver 112 and a clock 114, and the remote node 120 may comprise a transceiver 122 and a clock 124. The offset between the two clocks (i.e., the clock 114 and the clock 124) can be computed by cancelling out the terms due to the symmetric structure, as shown in Eq. (1).

$$ClockDelay_{remote} = \frac{Mea_{remote} - Mea_{local}}{2}, \quad (1)$$

where $Mea_{remote}$ is the time measured (or recorded) by the remote node 120, and $Mea_{local}$ is the time measured (or recorded) by the local node 110.

where $Mea_{remote}$ is the time measured (or recorded) by the remote node 120, and $Mea_{local}$ is the time measured (or recorded) by the local node 110.

As can be seen, Eq. (1) requires the following two conditions are met: (i) the time at which the time-based signal is transmitted is the same for both Transmit (TX) and Receive (RX) sides; and (ii) the propagation delay of the time signal must be the same in the two directions. In real applications such as Two-Way Satellite Time and Frequency Transfer (TWSTFT), the first condition is met automatically by using the time transfer modem. To meet the second condition, users usually assume the remote node and the local node are stationary and use same transceiver and processing blocks. However, many dynamic situations cause a phase shift between two measurements (e.g., RF, optical) traversing in opposite directions in the same closed path— known as the Sagnac effect. For satellite applications, the Sagnac effect needs to be compensated to high-precision time synchronization results.

To overcome the above drawbacks associated with the standard TWTT, the present disclosure develops an enhanced multi-way TT (EM-WaTT) that can handle the case where communication delays are not identical. The disclosed EM-WaTT is based on an enhanced TWTT. With flying UASs, the communication delays are dynamically changing over the time and not identical/fixed. In a typical UAS DCB scenario, there is one master node (a master UAS) and then many slave nodes (slave UASs). The goal of EM-WaTT is to synchronize the local clocks of slave nodes to the clock of the master node.

Figure 2:
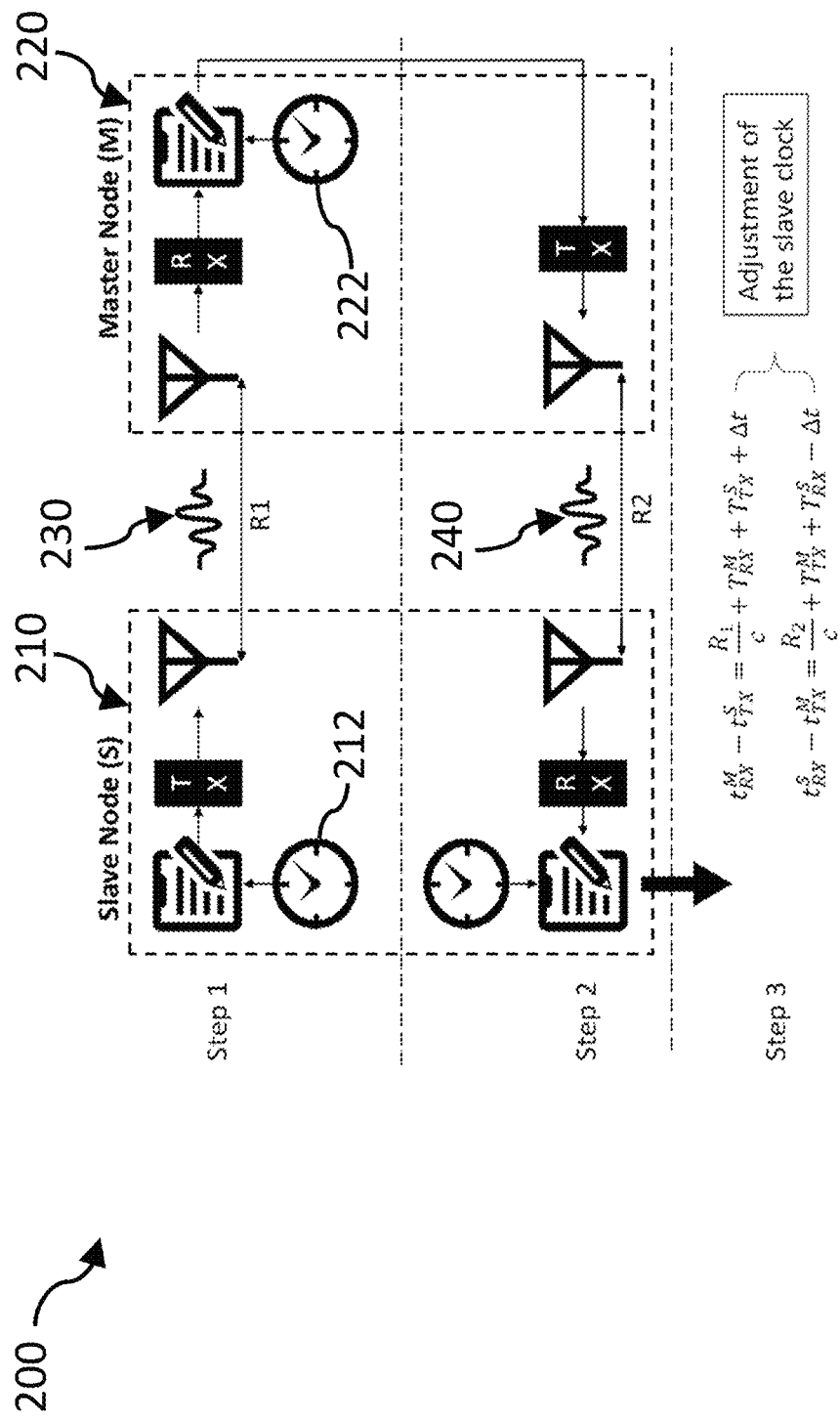
FIG. 2 illustrates an example diagram depicting an Enhanced Multi-Way Time Transfer (EM-WaTT) for two nodes, according to one embodiment of the present disclosure.

FIG. 2 illustrates an example diagram 200 depicting an Enhanced Multi-Way Time Transfer (EM-WaTT), according to one embodiment of the present disclosure. As shown in FIG. 2, the EM-WaTT disclosed herein may comprise three steps. In this example, it is assumed that the slave node and master node can exchange information via wireless communication. In step 1: the slave node 210 launches the time synchronization by sending a message 230 to the master node 220. The message 230 may include a start time ($t_{TX}^S$) on a slave clock 212. Upon receiving the message 230, the master node 220 will add a receiving time ($t_{RX}^M$) on a master clock 222 to the message 230. In step 2: the master node 220 immediately sends an updated message 240 back to the slave node 210, which will immediately add a receiving time ($t_{RX}^S$) on the slave clock 212 to the received updated message 240. In step 3: the slave node 210 performs a clock adjustment based on the updated message 240, which can be mathematically expressed as:

$$t_{RX}^M - t_{TX}^S = \frac{R_1}{C} + T_{RX}^M + T_{TX}^S + \Delta t, \qquad (2)$$

$$t_{RX}^S - t_{TX}^M = \frac{R_2}{c} + T_{TX}^M + T_{TX}^S - \Delta t, \qquad (3)$$

where $R_1$ and $R_2$ are the distance between the nodes (the master node 220 and the slave node 210) at the transmission time of the slave node 210 and the master node 220, respectively. $T_{TX}^S$ and $T_{RX}^S$ are the TX and RX processing times of the slave node 210. Similarly, $T_{RX}^M$ and $T_{TX}^M$ are the RX and TX processing time of the master node 220. In real applications, the RX and TX processing functions are usually implemented in a field-programmable gate array (FGPA), so the processing times are fixed on the local clocks. In other words, these values can be predefined. The speed the radio wave is denoted by a constant c. $\Delta t$ is the clock difference between the slave node 210 and master node 220. There is also $t_{RX}^M = t_{TX}^M$, because the master node 220 will send the updated message 240 upon updating the received message 230.

From eq. (2) and eq. (3), then:

$$R_1 + R_2 = (t_{RX}^S - t_{TX}^S - T_{RX}^M - T_{TX}^S - T_{TX}^M - T_{RX}^S)c. \qquad (4)$$

$$\Delta t = \frac{R_2 - R_1}{2c} + \frac{(2t_{RX}^M - t_{TX}^S - t_{RX}^S + T_{TX}^M + T_{RX}^S - T_{RX}^M - T_{TX}^S)}{2}, \qquad (5)$$

On the other hand, from the motions of the slave node 210 and the master node 220, then:

$$R_2 - R_1 = \hat{v}_s \cdot \hat{x}_s (t_{RX}^S - t_{TX}^M - T_{RX}^S - T_{TX}^M), \qquad (6)$$

where $\hat{v}_s$ and $\hat{x}_s$ are the relative speed vector and position vector of the slave node 210 to the master node 220, respectively. The operator denotes the inner product of the two vectors. For an initial study, it may be assumed that $\hat{v}_s$ and $\hat{x}_s$ are known.

After computing $R_1$ and $R_2$ in Eq. (7) and Eq. (8), a Cubature Kalman Filter (CKF) or Consensus-based Filter (based on the range measurements) tracks the values of $\hat{v}_s$ and $\hat{x}_s$.

From Eq. (4) and Eq. (5), then:

$$R_1 = 0.5[(t_{RX}^S - t_{TX}^S - T_{RX}^M - T_{TX}^S - T_{TX}^M - T_{RX}^S)c - \hat{v}_s \cdot \hat{x}_s (t_{RX}^S - t_{TX}^M - T_{RX}^M - T_{TX}^M)], \qquad (7)$$

$$R_2 = 0.5[(t_{RX}^S - t_{TX}^S - T_{RX}^M - T_{TX}^S - T_{TX}^M - T_{RX}^S)c + \hat{v}_s \cdot \hat{x}_s (t_{RX}^S - t_{TX}^M - T_{RX}^M - T_{TX}^M)]. \qquad (8)$$

Combining Eqs. (5) and (6), the slave clock adjustment is:

$$\Delta t = \frac{\hat{v}_s \cdot \hat{x}_s (t_{RX}^S - t_{TX}^M - T_{RX}^S + T_{RX}^M)}{2c} + \frac{(2t_{RX}^M - t_{TX}^S - t_{RX}^S + T_{TX}^M + T_{RX}^S - T_{RX}^M - T_{TX}^S)}{2}. \qquad (9)$$

Figure 3:
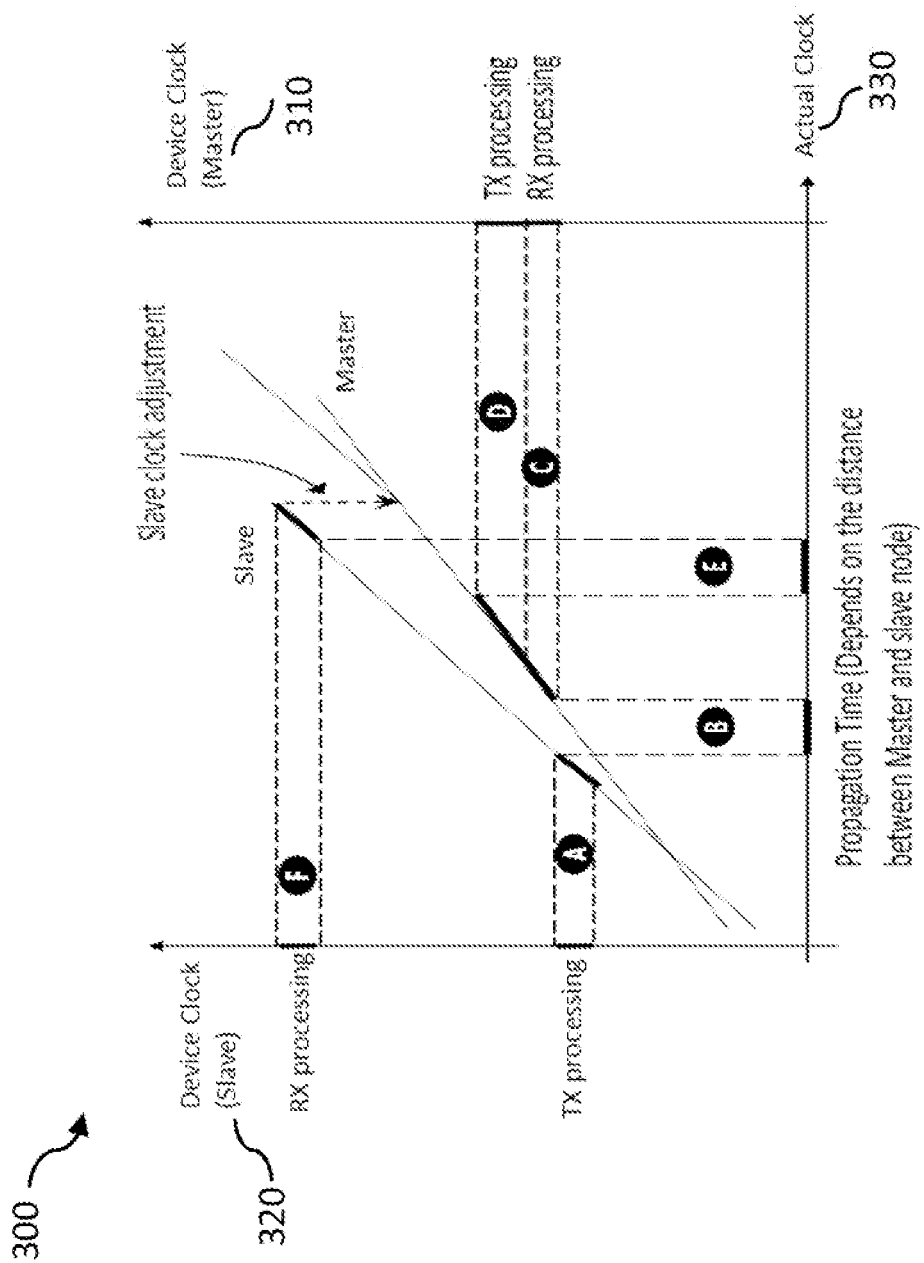
FIG. 3 illustrates another example diagram depicting an Enhanced Multi-Way Time Transfer (EM-WaTT) for two nodes, according to one embodiment of the present disclosure.

FIG. 3 depicts an example diagram 300 of an EM-WATT for two nodes (a master node and a slave node) illustrating the processing times and propagation delays on three clocks: a master clock 310, a slave clock 320 and an actual clock 330. Specifically, the slave node's processing times (intervals A and F) are measured on the slave clock 320. The radio propagation delays (B and E) are counted on the actual clock 330 (which may be a virtual clock with perfect timings). Similarly, processing times (C and D) of the master node are measured on the master clock 310. Without loss of generality, the time of computing clock difference (it) s can be merged into the RX processing time of the slave node.

Due to the high-precision (e.g., about 100 pico-seconds) time synchronization requirement for UAS cooperative beamforming, the time-driven simulations need a huge amount of random-access memory (RAM). Therefore, to simulate and verify the EM-WaTT, an event-driven numerical simulation method is disclosed herein.

Figure 4:
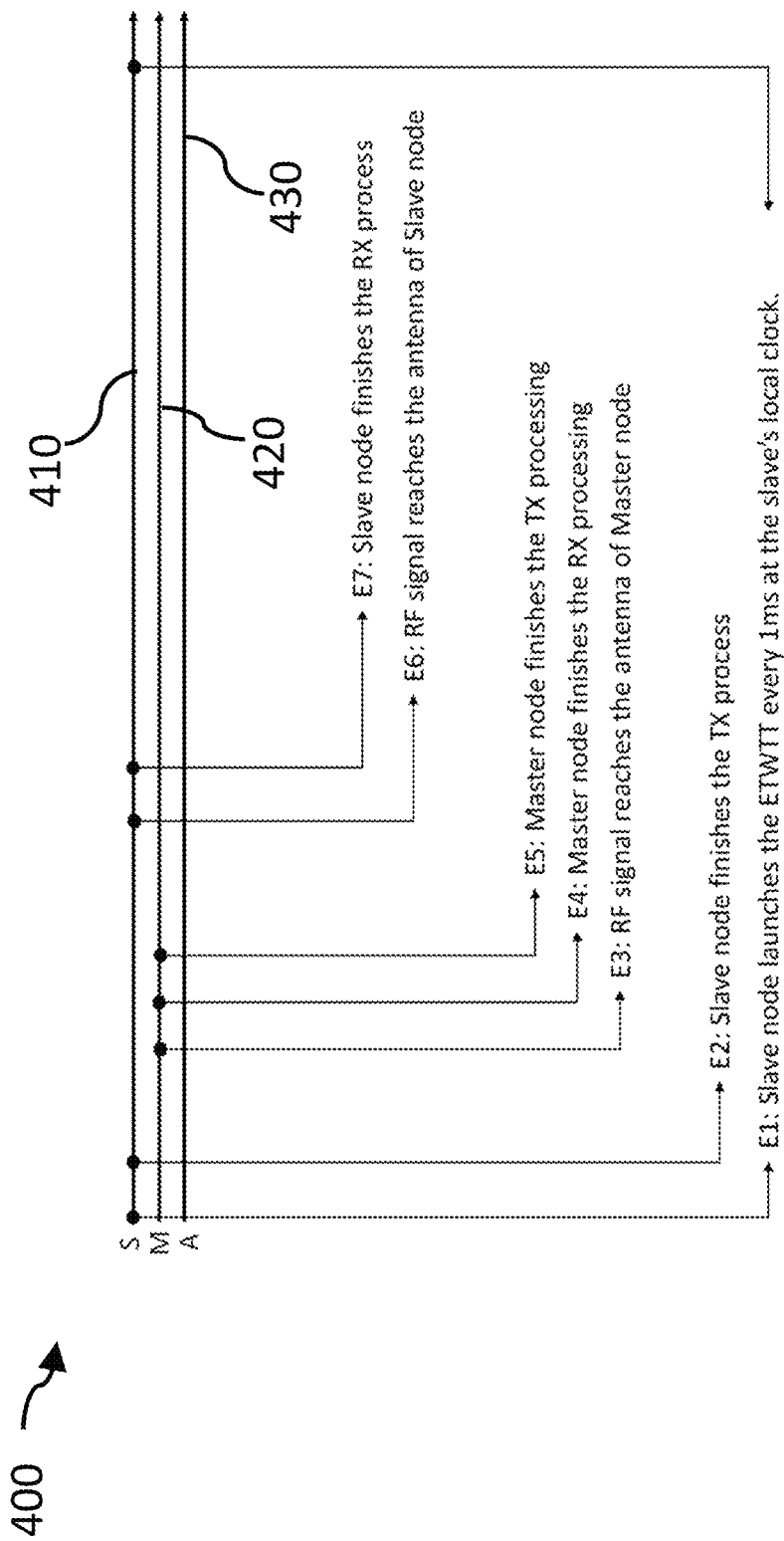
FIG. 4 illustrates a diagram of exemplary events of an EM-WaTT in one time synchronization cycle, according to one embodiment of the present disclosure.

FIG. 4 illustrates a diagram 400 of exemplary events of an EM-WaTT in one time synchronization cycle, according to one embodiment of the present disclosure. In this example embodiment, there are seven events in each time synchronization cycle, as shown in FIG. 4. The top three lines represent three clocks: a slave clock (S) 410, a master clock (M) 420, and an actual clock (A) 430. The dots are the events. The location of an event indicates not only the time, but also the clock that records the event time.

The processing times (e.g., shown in FIG. 3) can be represented using the events shown in FIG. 4. In the following equations, the minus (−) sign denotes the intervals between two events, and the local clock cycles (LCC) are from each clock.

$A = E2 - E1 =$ a fixed number of Slave LCC, (10)

$B = E3 - E2 = R_1/c$ (on the actual clock) (11)

$C = E4 - E3 =$ a fixed number of Master LCC, (12)

$D = E5 - E4 =$ a fixed number of Mater LCC, (13)

$E = E6 - E5 = R_2/c$ (on the actual clock) (14)

$F = E7 - E6 =$ a fixed number of Slave LCC. (15)

Figure 5:
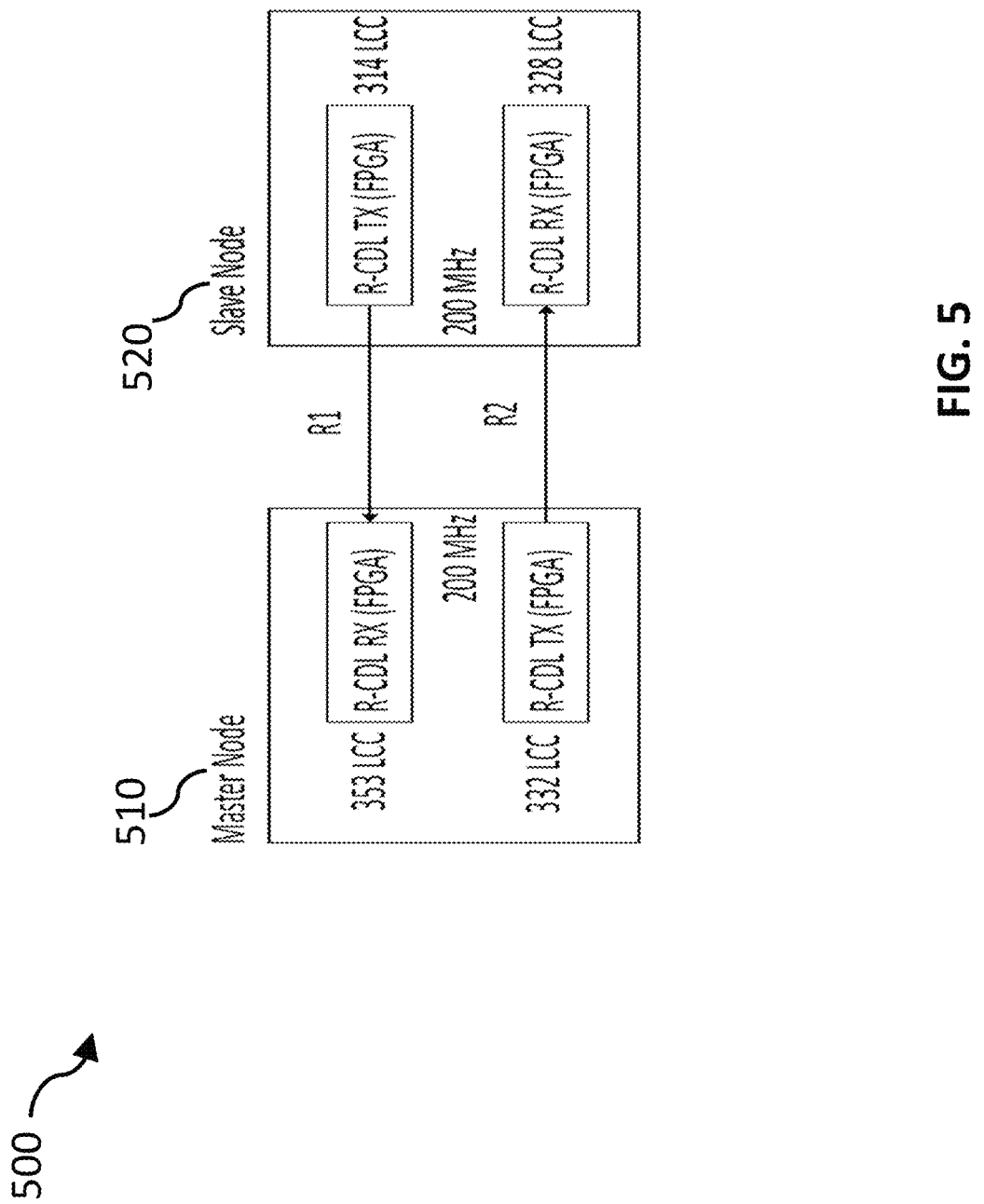
FIG. 5 illustrates estimated numbers of local clock cycles (LCCs) for a master node and a slave node, according to one embodiment of the present disclosure.

The FPGA times of TX and RX are estimated from the processing records for the master node and the slave node using a Xilinx Avnet Virtex-6 ML605 Development Board and Xilinx ISE v14.7 software. FIG. 5 illustrates a diagram 500 of estimated numbers of local clock cycles (LCCs) for a master node 510 and a slave node 520, according to one embodiment of the present disclosure. As shown in FIG. 5, the FPGA time of TX of the slave node 520 is 314 LCC; the FPGA time of RX of the master node 510 is 353 LCC; the FPGA time of TX of the master node 510 is 332 LCC; and the FPGA time of RX of the slave node 520 is 328 LCC. The clocks of FPGAs are set to 200 MHz. In some embodiments, a master node may need additional LCC to communicate with 10 slave nodes in a time-division multiple access (TDMA) method. In this example embodiments, Radar-Common Data Link (R-CDL) is used as the wireless communications among the UASs.

Since the events occur on different clocks, clock drifts need to be considered when computing the time intervals. In the simulated EM-WaTT system, the International Telecommunication Union (ITU) model is utilized:

$$x(t) = x_0 + y_0 t + \frac{D}{2}t^2 + \frac{\phi(t)}{2\pi v_{nom}}, \qquad (16)$$

where $x_0$ is the time error at t=0; $y_0$ is the fractional frequency error at =0; D is the linear fractional frequency draft rate; $\phi(t)$ is the random phase deviation component; and $v_{nom}$ is the nominal frequency.

Figure 6:
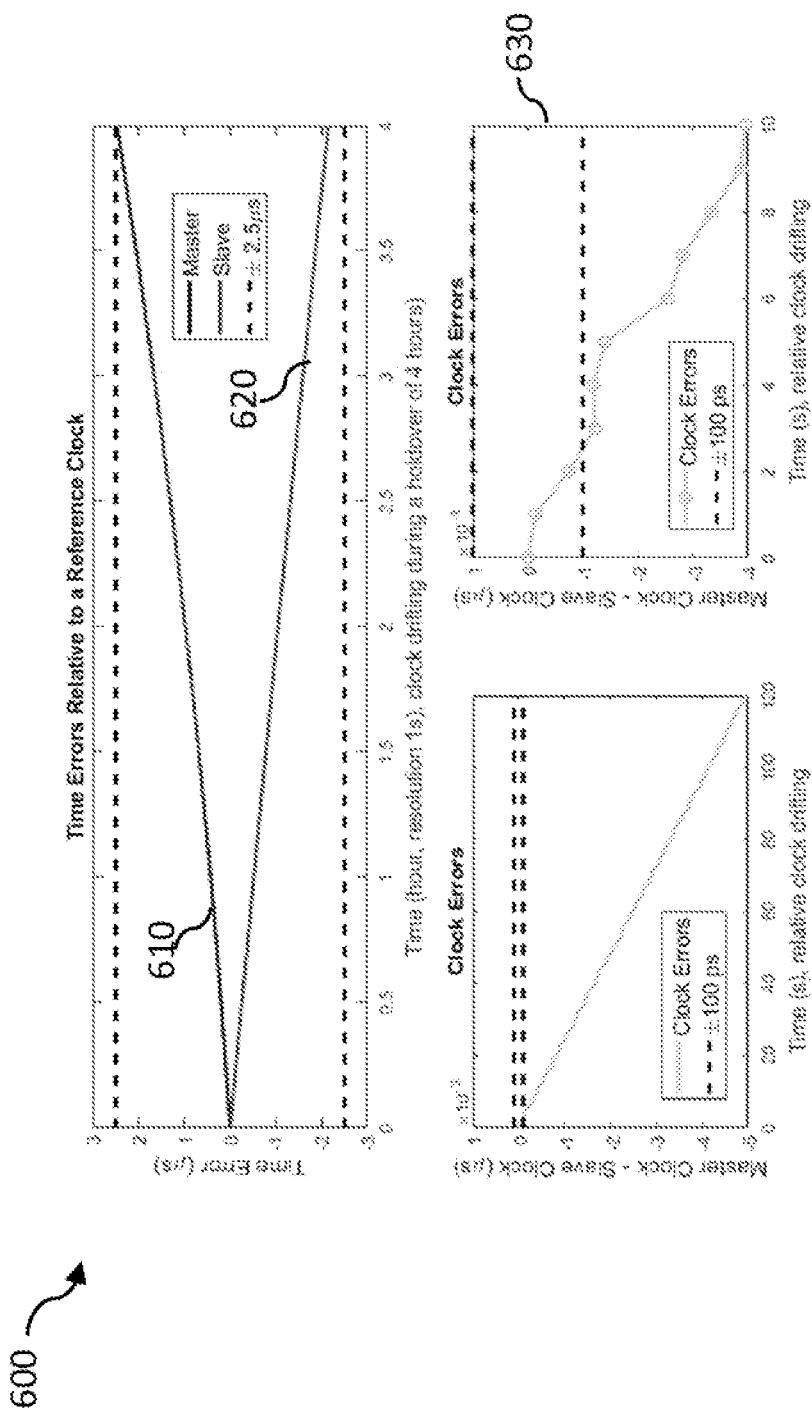
FIG. 6 illustrates a diagram of a worst scenario (a master clock and a slave clock drift in a opposite direction) of time synchronization between the slave node and the master node, according to one embodiment of the present disclosure.

For a typical chip-scale atomic clock (CSAC), which is recommended for UAS missions, the parameters of ITU model are derived to match the holdover performance (2.5 μs over 4 hours). FIG. 6 shows a diagram 600 of a worst scenario (a master clock 610 and a slave clock 620 drift in a opposite direction) of time synchronization between the slave node 620 and the master node 610, according to one embodiment of the present disclosure.

From a zoomed-in view (the bottom right subplot 630) of FIG. 6, perfect time synchronization needs to run at most every two seconds. Otherwise, the clock errors will exceed the required 100 pico-seconds. Actually, for a DCB scenario with 10 slave nodes in an area of one square mile, an EM-WaTT cycle can be finished in $$-\frac{(332 + 353 + 314 + 328)}{200 \times 10^6} + \frac{1600 \times \sqrt{2} \times 2}{3 \times 10^8} = 21.73 \ \mu s.$$

In this example simulation, each slave node is allowed to launch an EM-WaTT every one ms. In other words, the EM-WaTT runs at a frequency of 1 kHz. Hence, the interval between the E7 (of the last time synchronization cycle) and E1 (of the new time synchronization cycle) in FIG. 5 is about 978.27 μs. The <1 ms interval enables the EM-WaTT system to run faster than 1 kHz and handle more than ten slave nodes.

To demonstrate the performance of EM-WaTT for a representative scenario, digital terrain elevation data (DTED) was obtained from the United States Geological Survey (USGS) website. FIG. 1 illustrated a selected area 700 for numerical simulations of EM-WaTT, according to one embodiment of the present disclosure. For the analysis, an area 710 of Washington DC is selected as shown in FIG. 7.

Figure 7:
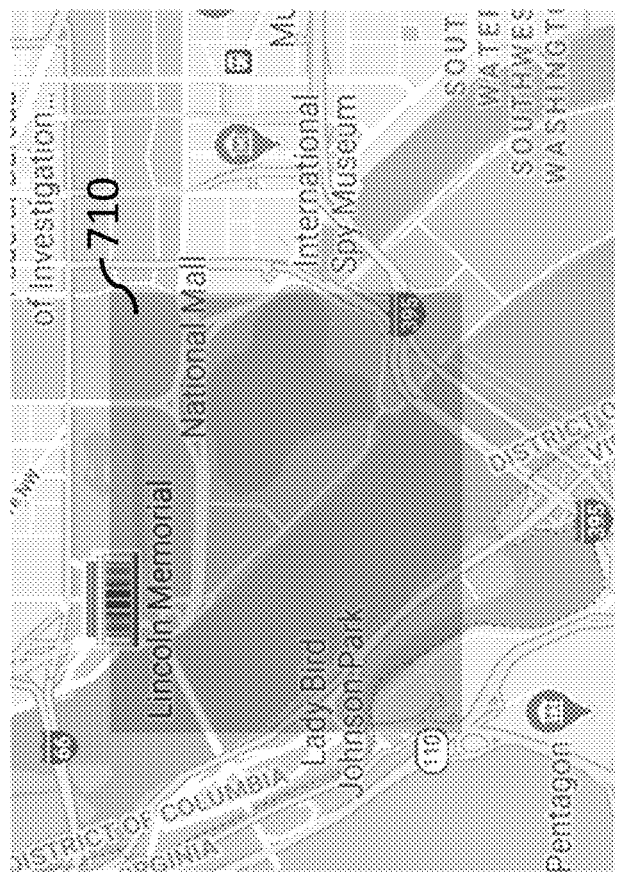
FIG. 7 illustrates a selected area for numerical simulations of EM-WaTT, according to one embodiment of the present disclosure.
Figure 8:
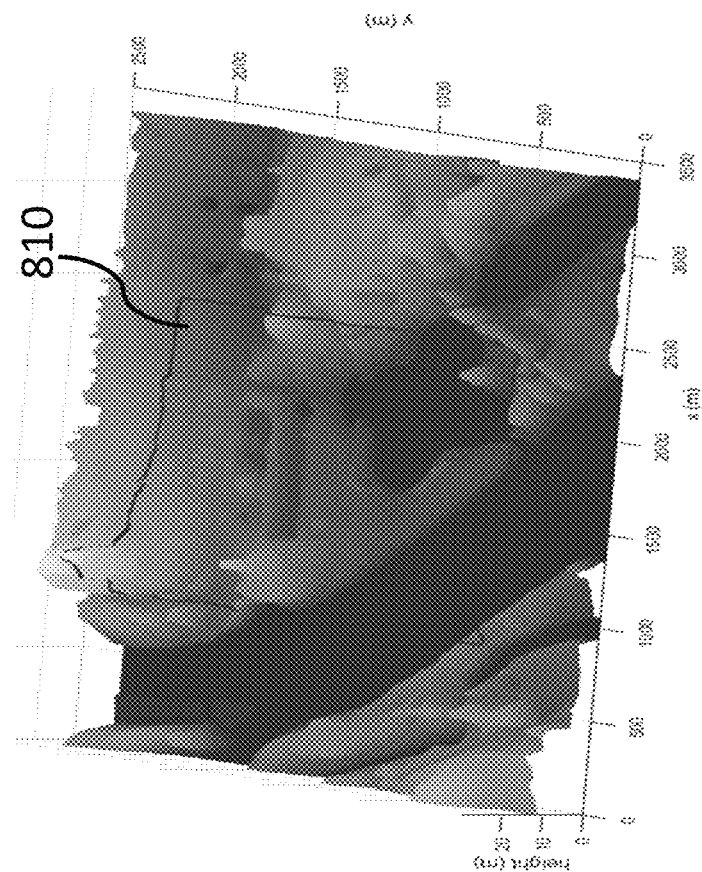
FIG. 8 illustrates a diagram of digital elevation data of the selected area in FIG. 7 for the EM-WaTT simulation, according to one embodiment of the present disclosure.

FIG. 8 illustrates a diagram 800 of digital elevation data of the selected area in FIG. 7 for the EM-WaTT simulation, according to one embodiment of the present disclosure. The DTED processed data is visualized in FIG. 8, where the square 810 enclosed by lines denotes an area of about one square mile.

Figure 9:
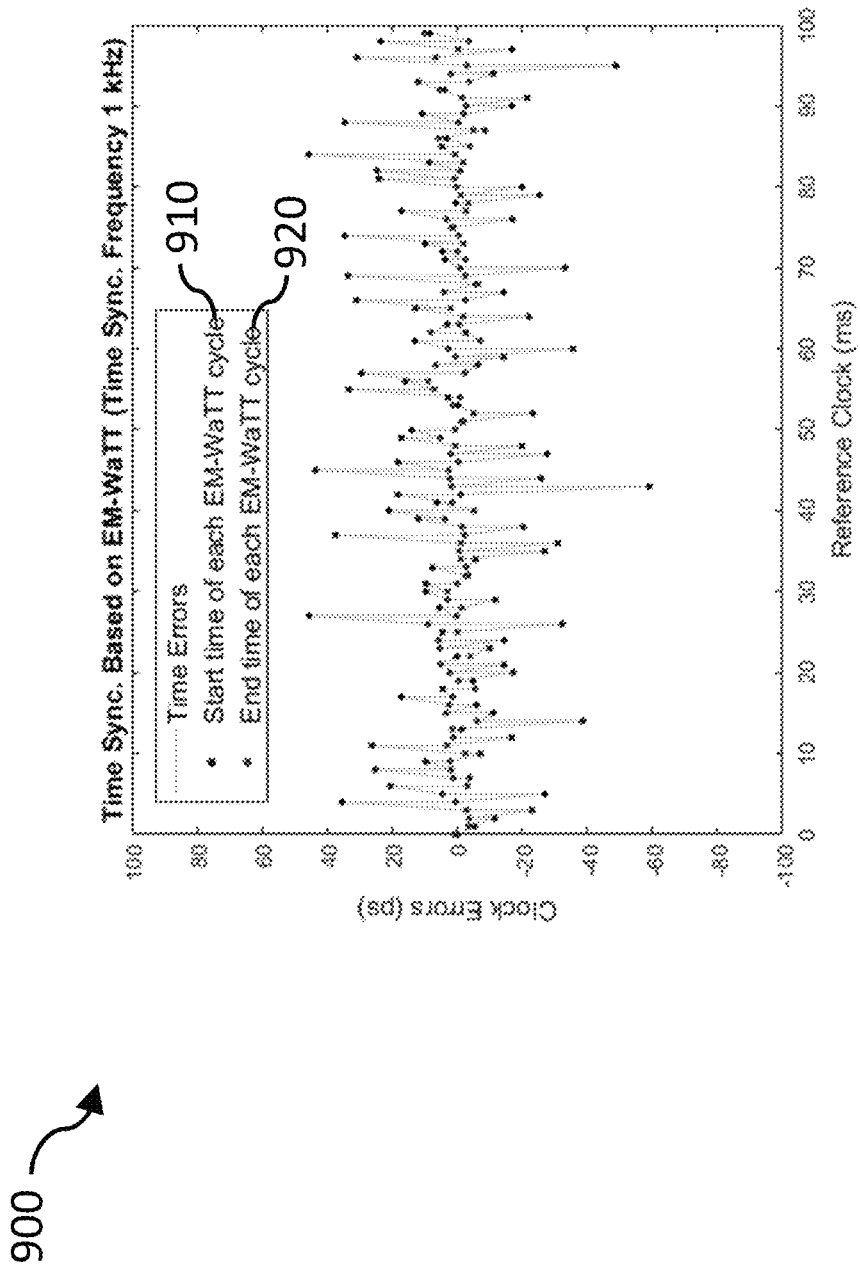
FIG. 9 illustrates a diagram of performance of EM-WaTT with two nodes, according to one embodiment of the present disclosure.

In this example embodiment, a case with one master node and one slave node is first simulated. It is assumed at the time 0, $t_0$, the two clocks are synchronized. FIG. 2 illustrates a diagram 900 of performance of EM-WaTT with two nodes (one master node and one slave node), according to one embodiment of the present disclosure. Specifically, FIG. 9 shows the performance of the EM-WaTT in a period of 100 ms. The x-axis in FIG. 9 is the reference clock or the actual clock.

In the diagram 900, the blue dots 910 represent the start times of EM-WaTT cycles. In other words, the blue dots 910 are clock errors when the E1 events (FIG. 7) occur. Similarly, the red dots 920 denote the clock mismatches when the E7 events (FIG. 7) happen. With perfect communications between the master node and the slave node, the required time synchronization requirement of 100 pico-seconds (ps) can be achieved.

Figure 10:
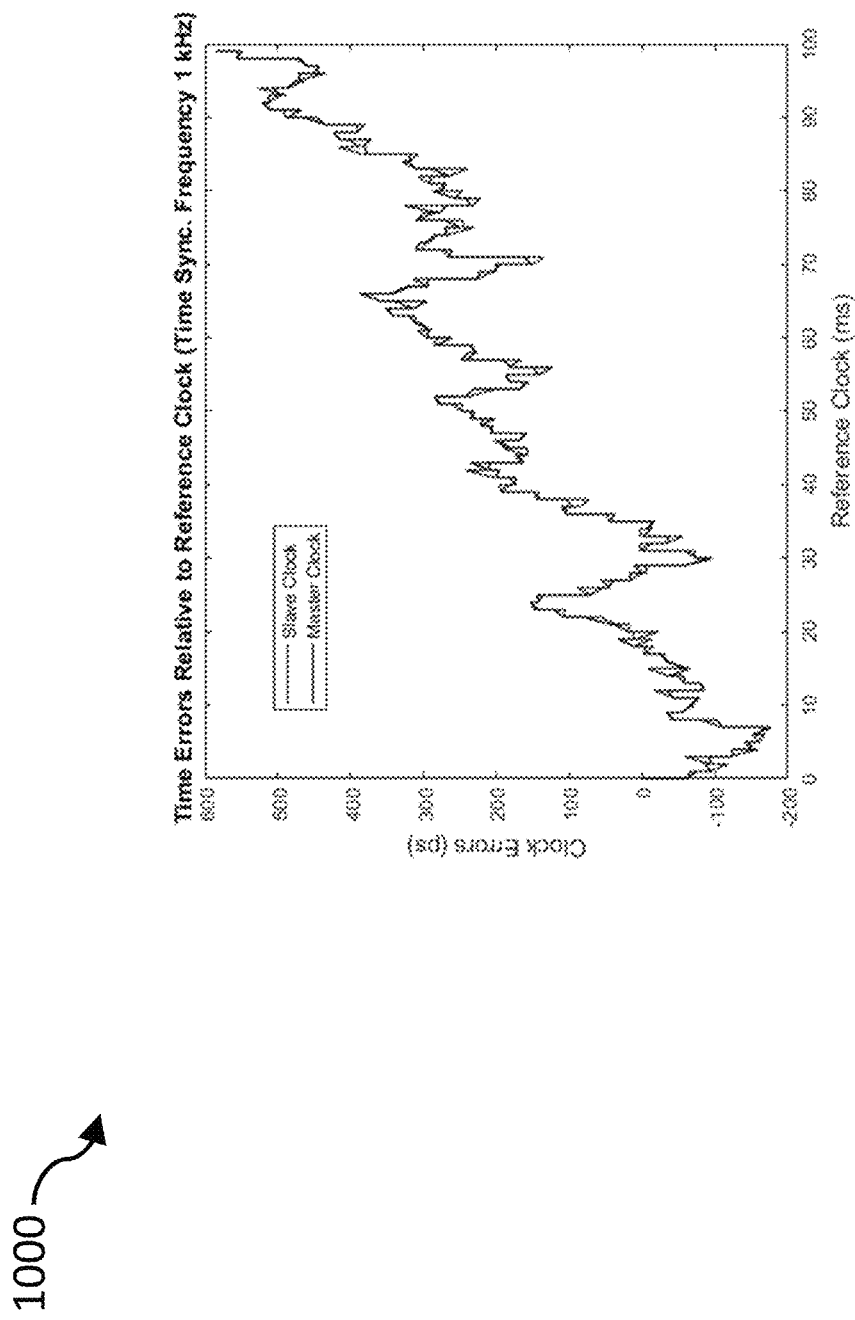
FIG. 10 shows a diagram of clock errors relative to the actual clock, according to one embodiment of the present disclosure.

While the EM-WaTT synchronizes the master clock and the slave clock, the clock errors relative to the actual clock or reference clock still exist. FIG. 10 illustrates a diagram 1000 of clock errors relative to the actual clock, according to one embodiment of the present disclosure. However, as shown in FIG. 10, these clock errors will not affect the DCB performance because the actual clock errors depend on the cohesiveness of the master clock and the slave clock.

Figure 11:
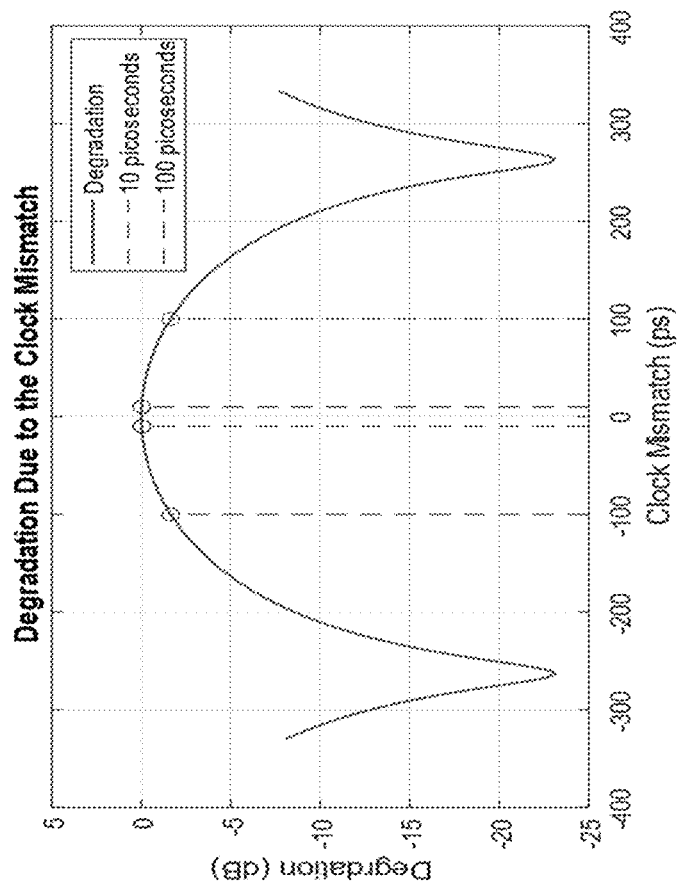
FIG. 11 shows a diagram of distributed cooperative beamforming (DCB) sensitivity analysis relative to the time synchronization with two nodes, according to one embodiment of the present disclosure.

To further examine the performance bounds, a sensitivity analysis of a DCB mission is conducted with an operating frequency of 1.9 GHz. The computed DCB degradation due to the clock mismatch can be determined as:

$$DCBdeg(\Delta t) = \frac{P(\Delta t)}{P(0)}, \qquad (17)$$

where P is the received power at the destination of interest. FIG. 3 illustrates a diagram 1100 of DCB sensitivity analysis relative to the time synchronization with two nodes and a frequency of 1.9 GHz, according to one embodiment of the present disclosure. As shown in FIG. 11, the EM-WaTT guarantees the DCB-degradation value between −1.6393 dB and 0 dB.

In this example embodiment, a second case is simulated as well. The second case comprises a swarm with 10 UAS randomly distributed spatially throughout a one-mile area. The reason to choose the randomized UAS locations is to reduce the slide lobe gain of the DCB performance.

Figure 12:
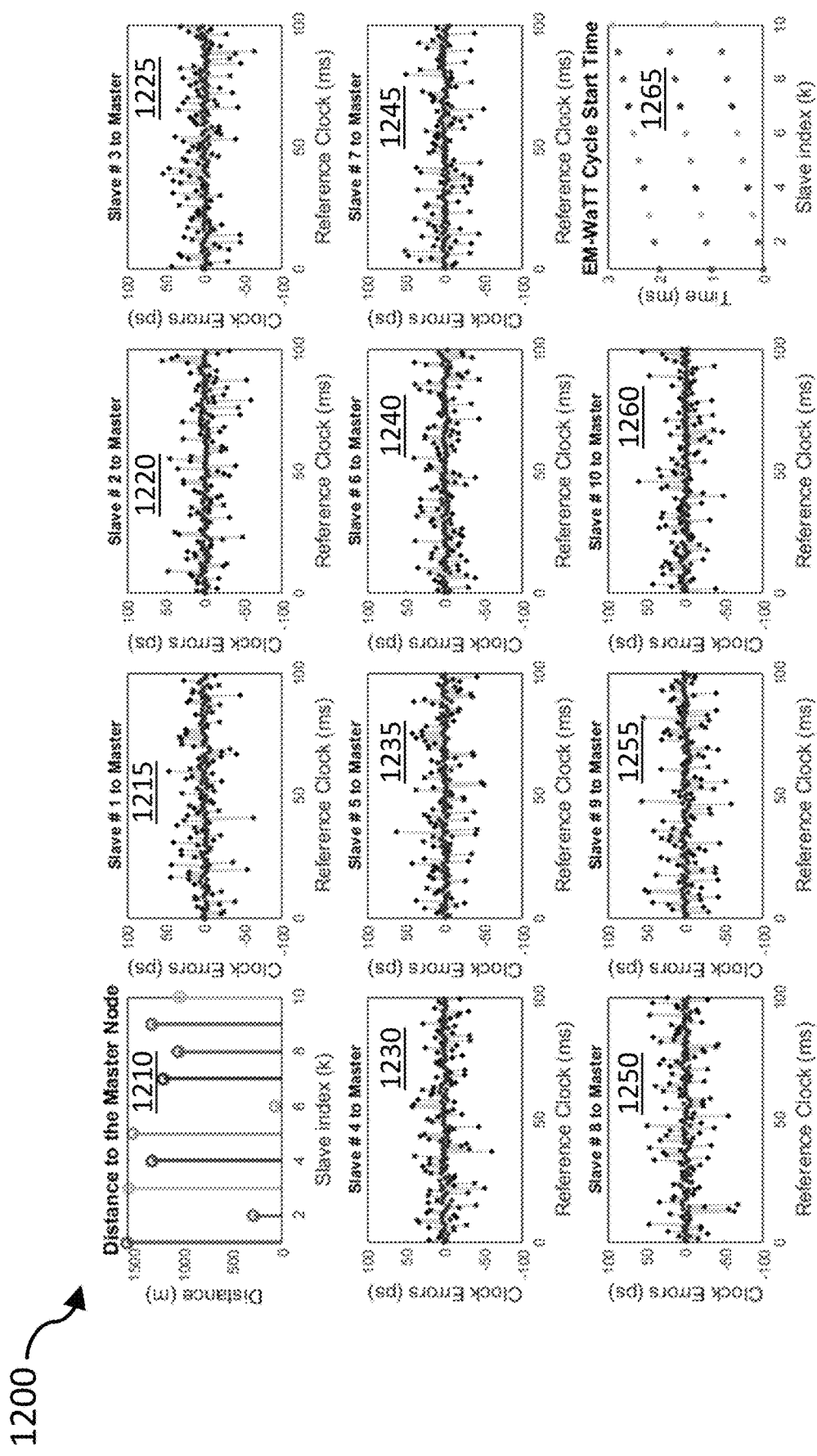
FIG. 12 shows diagrams of performance of EM-WaTT with one master node and ten slave nodes, according to one embodiment of the present disclosure.

FIG. 12 shows a series of diagrams 1200 of the EM-WaTT performance of 11 nodes (one master node and ten slave nodes), according to one embodiment of the present disclosure. In FIG. 12, the diagram 1210 shows the ten slave nodes' distances to the master node. The diagrams 1215, 1220, 1225, 1230, 1235, 1240, 1245, 1250, 1255, and 1260 show the ten slave nodes' clock errors to the master node, respectively. The blue dots represent the start times of EM-WaTT cycles while the red dots denote the clock mismatches when the E7 events happen. The diagram 1265 shows the TDMA of the ten slave nodes. The time synchronization cycles are well separated so that the master node can handle the ten slave nodes' time synchronization requests.

Figure 13:
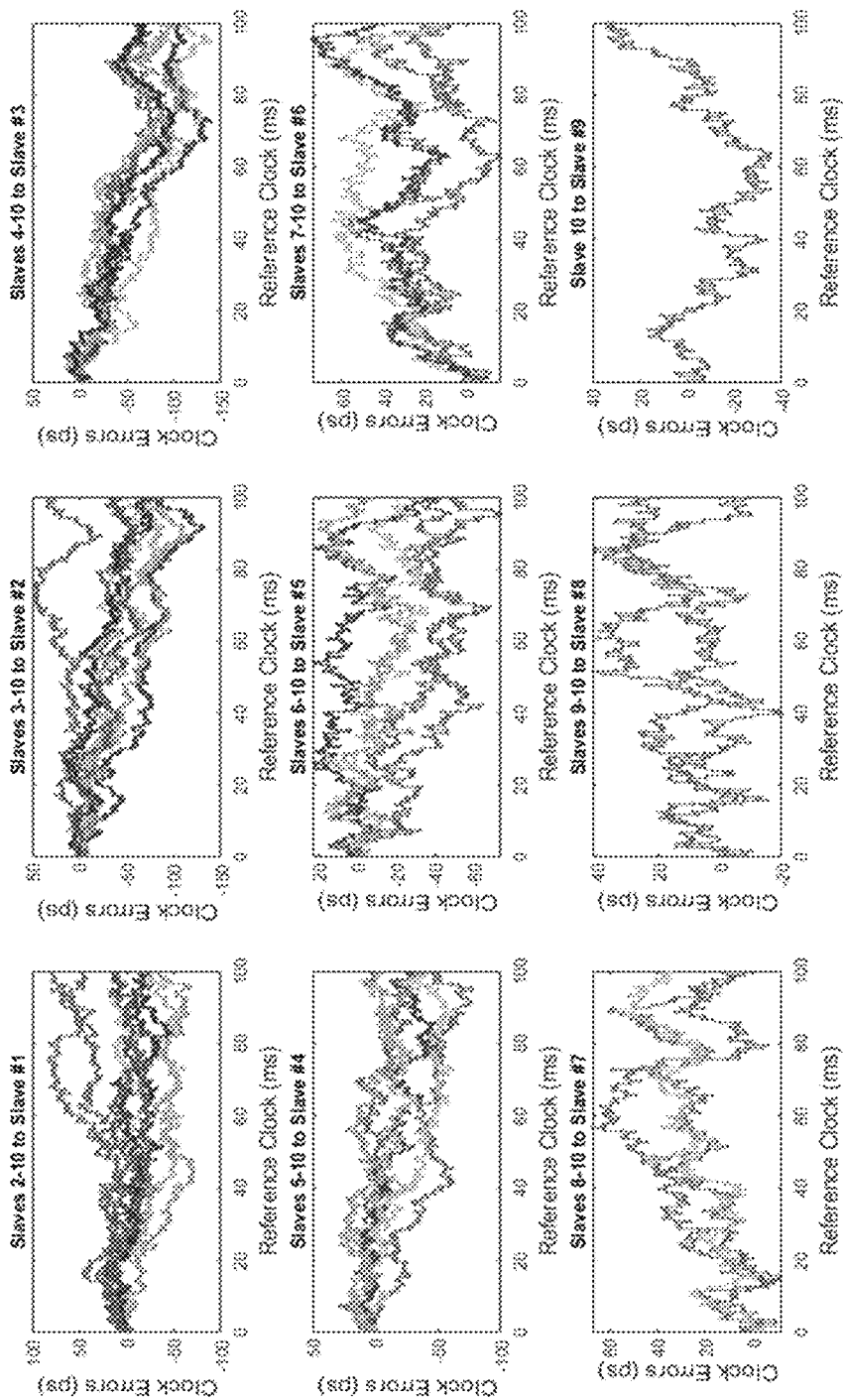
FIG. 13 shows diagrams of pairwise clock errors of the ten slave clocks in FIG. 12, according to one embodiment of the present disclosure.

FIG. 13 shows a series of diagrams 1300 of the pairwise clock errors of the ten slave clocks in FIG. 12, according to one embodiment of the present disclosure. As seen from FIG. 12 and FIG. 13, the time synchronization based on EM-WaTT meets the time synchronization accuracy (e.g., 100 ps) desired for DCB missions.

Figure 14:
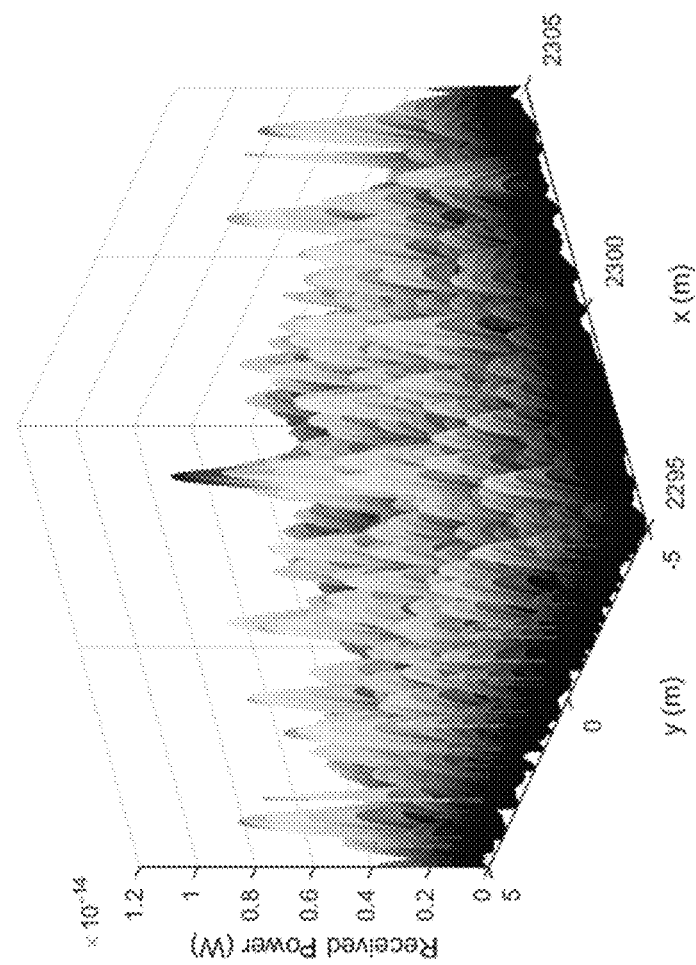
FIG. 14 illustrates a diagram of DCB performance with EM-WaTT enabled, according to one embodiment of the present disclosure.
Figure 15:
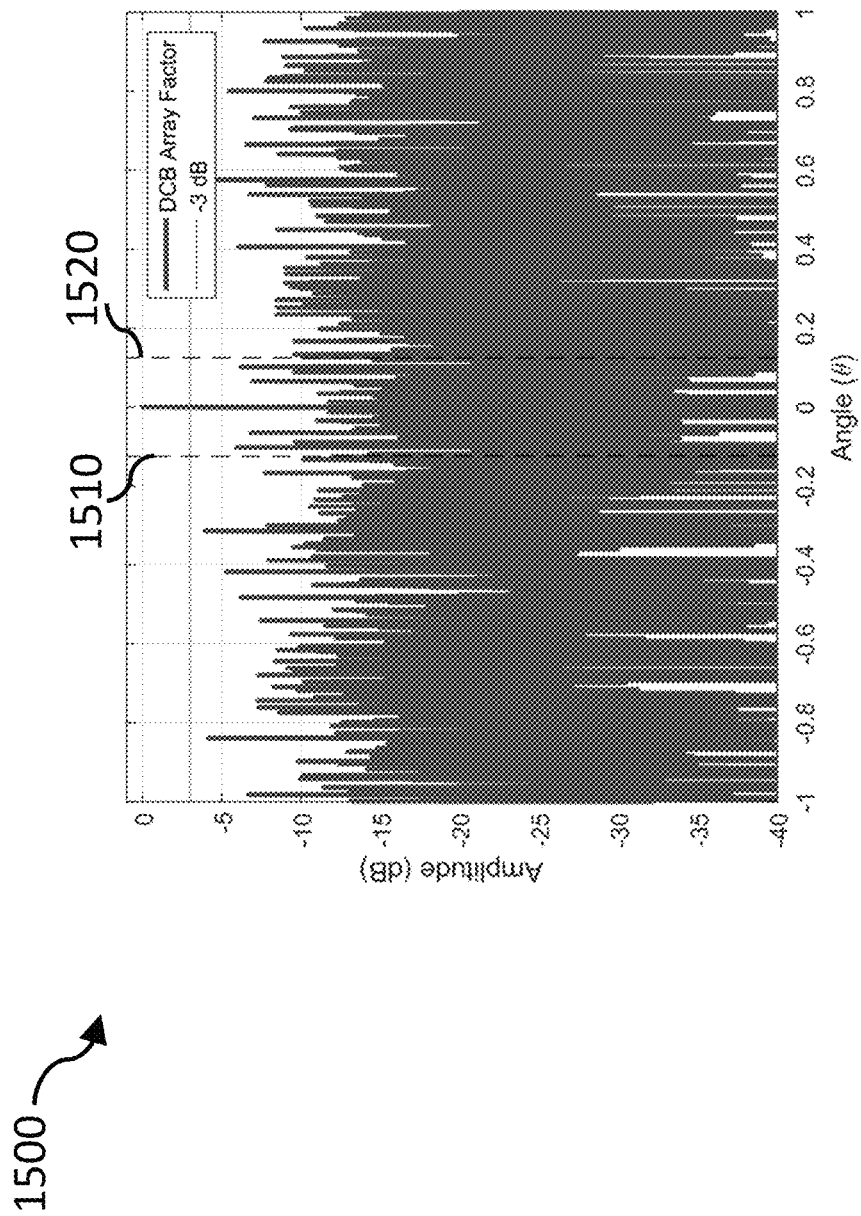
FIG. 15 shows a diagram of equivalent array factor of a DCB mission with a distance of about 2300 m between a destination and a master node, according to one embodiment of the present disclosure.

In another example, a DCB mission is simulated where the destination is 2300 m away from the master node. In the multi-UAS DCB simulation, the transmission power is set to −20 dBm. Dipole antennas are used with the antenna gain of DCB mission being 3 dBi. The antenna gain of the receiver is 3 dBi. The DCB performance is illustrated in FIG. 14 and FIG. 15. FIG. 4 illustrates a diagram 1400 of DCB performance with EM-WaTT enabled, according to one embodiment of the present disclosure. FIG. 15 shows a diagram 1500 of equivalent array factor of the DCB mission with a distance of 2300 m between the destination and the master node, according to one embodiment of the present disclosure.

The diagram 1400 in FIG. 14 shows the received powers within a 10 m×10 m neighboring area of the destination. Since the EM-WaTT system focuses on the relative power in the area, the low power level (~$10^{-14}$ W) does not influence the analysis. Actually, the power level can be easily increased by increasing the transmission powers and/or antenna gains. The diagram 1400 in FIG. 14 also shows the power peak is exact at the destination. The EM-WaTT enabled DCB supports the surgical beam pointing to the desired AOL. It is also shown in the diagram 1500 in FIG. 15 that the two vertical dash lines 1510, 1520 correspond to the boundary of the 10 m×10 m neighboring area. Actually, the angle of beam pointing is $$\Delta\theta = \frac{5m}{2300m} \times \frac{180^\circ}{\pi} = 0.1246^\circ.$$

In the present disclosure, an EM-WaTT is demonstrated as an enhanced TWTT method for high-precision time synchronization among UASs. Two conditions of the standard TWTT approach have been relaxed for the UASs. Event-driven numerical simulations demonstrate that the EM-WaTT meets the required time synchronization accuracy (100 ps) for DCB missions with reasonable power levels. A beam pointing DCB scenario with ten slave nodes and one master node within a one-square-mile area has been simulated to show the effectiveness of the disclosed EM-WaTT.

Figure 16:
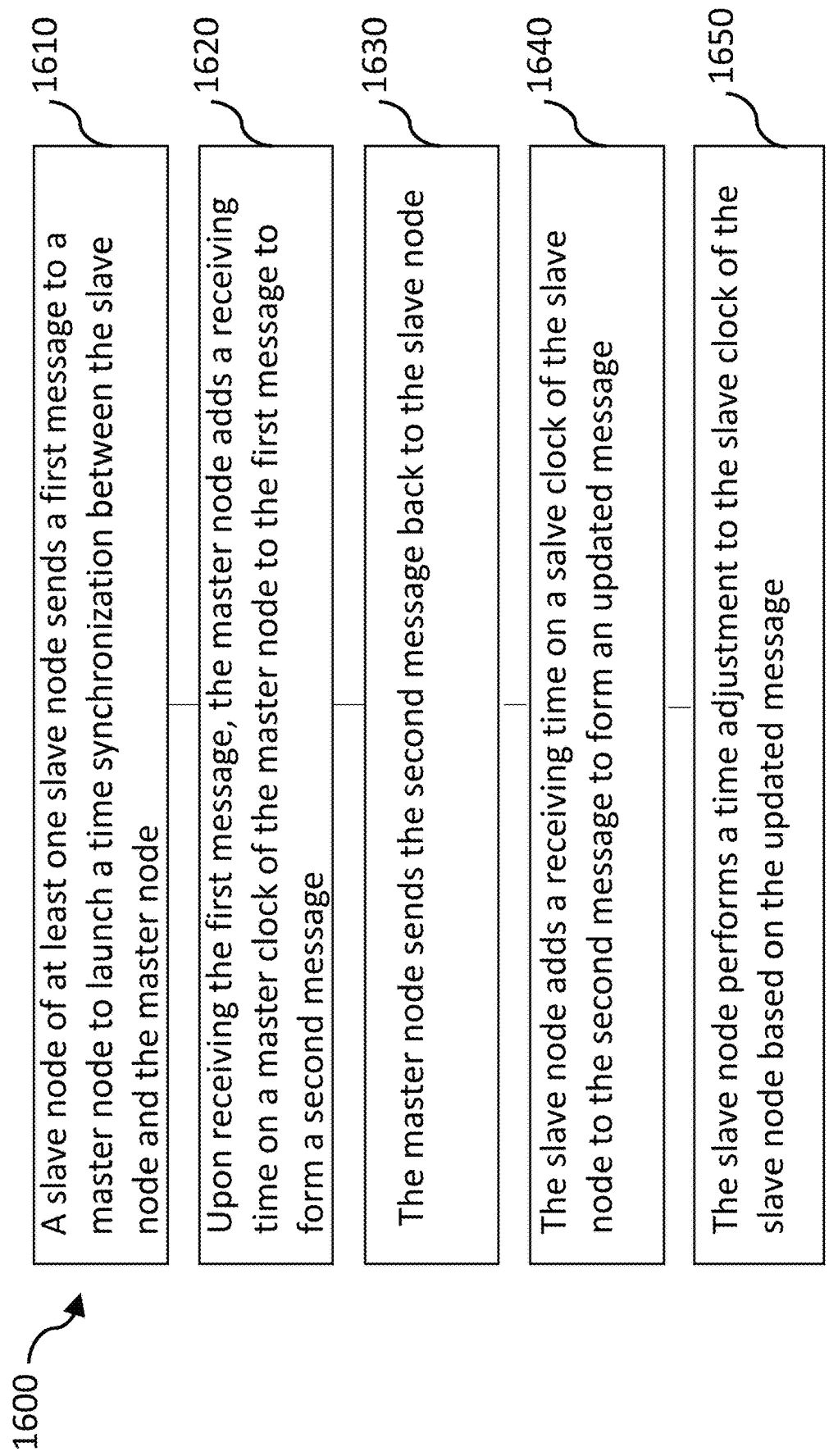
FIG. 16 shows an example computer processor-implemented method 1600 of enhanced multi-way time transfer (EM-WaTT) for high-precision time synchronization among unmanned aerial systems (UASs), according to one embodiment of the present disclosure.

FIG. 16 shows an example computer processor-implemented method 1600 of enhanced multi-way time transfer (EM-WaTT) for high-precision time synchronization among unmanned aerial systems (UASs), according to an embodiment of the disclosure. The example method 1600 may be implemented in an UAS system that may comprise at least one UAS as a slave node and one UAS as a master node, for example, the example system comprising one master node and ten slave nodes described above. The example method 1600 may be performed/executed by one or more hardware processors of the UASs (the at least one slave node and the master node), for example, the transceivers of the UASs. The at least one node and one master node may perform UAS-based distributed cooperative beamforming (DCB) missions. The example method 1600 may comprise, but not limited to, the following steps. The following steps of the method 1600 may be performed sequentially, in parallel, independently, separately, in any order, or in any combination thereof. Further, in some embodiments, one or more of the following steps of the method 1600 may be omitted, and/or modified. In some embodiments, one or more additional steps may be added o included in the method 1600.

In step 1610, a slave node of at least one slave node sends a first message to a master node to launch a time synchronization between the slave node and the master node. Herein each of the at least one slave node is an unmanned aerial system (UAS), and the one master node is an UAS. The at least one slave node and the master node may form a group of randomly and spatially distributed UASs for performing UAS-based distributed cooperative beamforming (DCB) missions. For example, the at least one slave node may comprise ten slave nodes. The master node and the at least one slave node may be randomly and spatially located in a one-square mile area. The at least one slave node and the one master node are configured to execute instructions for this method of enhanced multi-way time transfer for time synchronization between the at least one slave node and the master node. The goal of EM-WaTT is to synchronize the local clocks of slave nodes to the clock of the master node. The first message includes a start time of sending the first message on a slave clock of the slave node. The slave node may calculate a Transmit (TX) processing time of the first message.

In step 1620, upon receiving the first message, the master node adds a receiving time of receiving the first message on a master clock of the master node to the first message to form a second message. The master node may calculate a Receive (RX) processing time of the first message.

In step 1630, the master node sends the second message back to the slave node. The second message may include a start time of sending the second message on the master clock of the master node, and the master node may calculate a TX processing time of the second message.

In step 1640, the slave node adds a receiving time of receiving the second message on a slave clock of the slave node to the second message to form an updated message. The slave node may calculate a RX processing time of the second message.

In step 1650, the slave node performs a time adjustment to the slave clock of the slave node based on the updated message, thereby synchronizing time between the slave clock of the slave node and the master clock of the master node. The transceiver and/or field-programmable gate array (FGPA) of the slave node may calculate a first distance between the slave node and the master node at a transmission time of the first message (i.e., at the start time of sending the first message) and a second distance between the slave node and the master node at a transmission time of the second message (i.e., at the start time of sending the second message), respectively. The time adjustment may be determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

The time adjustment is a time difference Δt of the slave clock from the master clock and is calculated by the slave node using equations $$t_{RX}^M - t_{TX}^S = \frac{R_1}{c} + T_{RX}^M + T_{TX}^S + \Delta t, \quad t_{RX}^S - t_{TX}^M = \frac{R_2}{c} + T_{TX}^M + T_{RX}^S - \Delta t,$$

wherein the c is a speed of radio wave, $t_{TX}^S$ is the start time of sending the first message on the slave clock of the slave node, $T_{TX}^S$ is the TX processing time of the first message calculated by the slave node, $t_{RX}^M$ is the receiving time of receiving the first message on the master clock of the master node, $T_{RX}^M$ is the RX processing time of the first message calculated by the master node, $t_{TX}^M$ is a start time of sending the second message on the master clock of the master node, $t_{RX}^S$ is the TX processing time of the second message calculated by the master node, $t_{RX}^S$ is the receiving time of receiving the second message on the slave clock of the slave node, $T_{RX}^S$ is the RX processing time of the second message calculated by the slave node, $R_1$ is the first distance between the slave node and the master node at the start time $t_{TX}^S$ calculated by the slave node, and $R_2$ is a second distance between the slave node and the master node at the start time $t_{TX}^M$ calculated by the slave node.

In some embodiments, the master node and the at least one slave node are configured to perform UAS-based distributed cooperative beamforming (DCB) missions in a time-coordinated manner based on the time synchronization between the at least one slave node and the master node. In some other embodiments, the master node and the at least one slave nodes are configured to work together with radio frequency (RF) sensors and/or RF payloads to form a coherent beam on an area of interest (AOI) based on the time synchronization between the at least one slave node and the master node. In some embodiments, the master node and the at least one slave nodes are configured to be in wireless communications. The master node and the at least one slave node may be configured to randomly and spatially locate in a one-square mile area.

In some embodiments, a precision of the time synchronization of multiple distributed RF sources located on the at least one slave node and the master node in a GPS-denied environment is about 100 pico-seconds. That is, the time adjustment may be less than about 100 pico-seconds for the time synchronization of multiple distributed RF sources located on the at least one slave node and the master node in a GPS-denied environment. The time synchronization between the slave node and the master node may be completed within about 21.73 μs.

In some embodiments, the slave node may determine a processing time of the first message and a processing time of the second message, which are processed by the field-programmable gate array (FGPA) of the slave node. In some embodiments, the master node may determine a processing time of the first message and a processing time of the second message, which are processed by the FGPA of the master node. That is, the TX processing time of the first message and the RX processing time of the second message are calculated by a field-programmable gate array (FGPA) of the slave node; and the RX processing time of the first message and the TX processing time of the second message are calculated by the FGPA of the master node.

Figure 17:
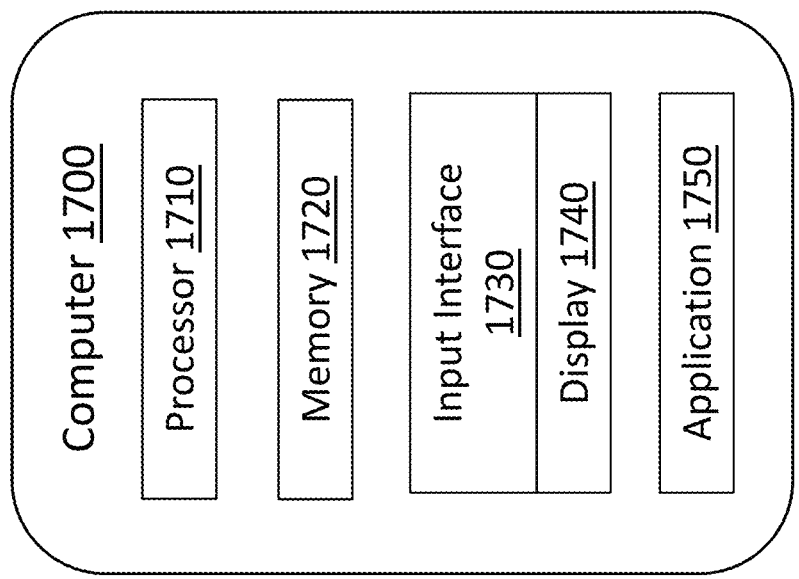
FIG. 17 illustrates an example computer system according to one embodiment of the present disclosure.

FIG. 17 illustrates an example computer system 1700 according to the present disclosure. The computer system 1700 may be used in the UAS systems disclosed herein for performing the methods disclosed herein and other functions. For example, the transceiver and/or the FGPA of the UAS may be implemented in the example computer system 1700. The computer system 1700 may also be used to control the UASs remotely and/or externally. The computer system 1700 may include, but not limited to, a desktop computer, a laptop computer, a notebook computer, a smart phone, a tablet computer, a mainframe computer, a server computer, a personal assistant computer, and/or any suitable network-enabled computing device. The computer system 1700 may comprise a processor 1710, a memory 1720 coupled with the processor 1710, an input interface 1730, a display 1740 coupled to the processor 1710 and/or the memory 1720, and an application 1750.

The processor 1710 may include one or more central processing cores, processing circuitry, built-in memories, data and command encoders, additional microprocessors, and security hardware. The processor 1710 may be configured to execute computer program instructions (e.g., the application 1750) to perform various processes and methods disclosed herein.

The memory 1720 may include random access memory, read only memory, programmable read only memory, read/write memory, and flash memory. The memory 1720 may also include magnetic disks, optical disks, floppy disks, hard disks, and any suitable non-transitory computer readable storage medium. The memory 1720 may be configured to access and store data and information and computer program instructions, such as the application 1750, an operating system, a web browser application, and so forth. For example, the memory 1720 may contain instructions for a method for enhanced multi-way time transfer (EM-WaTT) for high-precision time synchronization among unmanned aerial systems (UASs).

The input interface 1730 may include graphic input interfaces and any device for entering information into the computer system 1700, such as keyboards, mouses, microphones, digital cameras, video recorders, and the like.

The display 1740 may include a computer monitor, a flat panel display, a liquid crystal display, a plasma panel, and any type of device for presenting information to users.

The application 1750 may include one or more applications comprising instructions executable by the processor 1710, such as the methods disclosed herein. The application 1750, when executed by the processor 1710, may enable network communications among components/layers of the systems disclosed herein. Upon execution by the processor 1710, the application 1750 may perform the steps and functions described in this disclosure.

The present disclosure further provides a non-transitory computer readable storage medium storing instructions that, when executed by one or more processors, cause the one or more processors to perform a method for enhanced multi-way time transfer for time synchronization between at least one slave node and one master node. The method is implemented in a system including the at least one slave node each including at least one unmanned aerial system (UAS) and the one master node including one UAS. The method includes: sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message; upon receiving the first message, adding, by the master node, a receiving time of receiving the first message on a master clock of the master node to the first message to form a second message, the master node calculating a Receive (RX) processing time of the first message; sending, by the master node, the second message back to the slave node, the second message including a start time of sending the second message on the master clock of the master node, and the master node calculating a TX processing time of the second message; adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node. The slave node calculates a first distance between the slave node and the master node at the start time of sending the first message, and a second distance between the slave node and the master node at the start time of sending the second message, and the time adjustment is determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

The present disclosure may further provide a system. The system includes at least one slave node each including an unmanned aerial system (UAS), and one master node including one UAS. The at least one slave node and the one master node are configured to execute instructions for a method of enhanced multi-way time transfer for time synchronization between the at least one slave node and the master node. The method includes: sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message; upon receiving the first message, adding, by the master node, a receiving time of receiving the first message on a master clock of the master node to the first message to form a second message, the master node calculating a Receive (RX) processing time of the first message; sending, by the master node, the second message back to the slave node, the second message including a start time of sending the second message on the master clock of the master node, and the master node calculating a TX processing time of the second message; adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node. The slave node calculates a first distance between the slave node and the master node at the start time of sending the first message, and a second distance between the slave node and the master node at the start time of sending the second message, and the time adjustment is determined by the slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

As described above in FIG. 3 and FIG. 4 and descriptions thereof, the present disclosure further provides an event-driven simulation method of enhanced multi-way time transfer for time synchronization between at least one slave node and one master node, wherein the method is implemented in a system comprising the at least one slave node each comprising an unmanned aerial system (UAS) and the one master node comprising one UAS. The event-driven simulation method includes: performing a first event, by one slave node of the at least one slave node, to launch an enhanced two-way time transfer every one millisecond at a local clock of the one slave node; performing a second event, by the one slave node, to send a first message to the master node to launch a time synchronization between the one slave node and the master node, the first message including a start time of sending the first message on the local clock of the one slave node, and the one slave node calculating a Transmit (TX) processing time of the first message; performing a third event, by the master node, to receive the first message through an antenna of the master node; performing a fourth event, by the master node, to add a receiving time of receiving the first message on a master clock of the master node to the first message to form a second message, the master node calculating a Receive (RX) processing time of the first message; performing a fifth event, by the master node, to send the second message back to the one slave node, the second message including a start time of sending the second message on the master clock of the master node, and the master node calculating a TX processing time of the second message; performing a sixth event, by the one slave node, to receive the second message through an antenna of the one slave node; and performing a seventh event, by the one slave node, to add a receiving time of receiving the second message on the local clock of the one slave node to the second message to form an updated message, the one slave node calculating a RX processing time of the second message; and to perform a time adjustment to the local clock of the one slave node based on the updated message, thereby synchronizing time between the local clock of the one slave node and the master clock of the master node, wherein the one slave node calculates a first distance between the one slave node and the master node at the start time of sending the first message, and a second distance between the one slave node and the master node at the start time of sending the second message, and the time adjustment is determined by the one slave node based on the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance and the second distance.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system, comprising:
at least one slave node each comprising an unmanned aerial system (UAS); and
one master node, comprising one UAS,
wherein the at least one slave node and the one master node are configured to execute instructions for a method of enhanced multi-way time transfer for time synchronization between the at least one slave node and the master node, the method comprising:
sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message;
upon receiving the first message, adding, by the master node, a receiving time of receiving the first message on a master clock of the master node to the first message to form a second message, the master node calculating a Receive (RX) processing time of the first message;
sending, by the master node, the second message back to the slave node, the second message including a start time of sending the second message on the master clock of the master node, and the master node calculating a TX processing time of the second message;
adding, by the slave node, a receiving time of receiving the second message on the slave clock of the slave node to the second message to form an updated message, the slave node calculating a RX processing time of the second message; and
performing, by the slave node, a time adjustment to the slave clock of the slave node based on the updated message, thereby synchronizing time between the slave clock of the slave node and the master clock of the master node, wherein:
the slave node calculates a first distance between the slave node and the master node at the start time of sending the first message, and calculates a second distance between the slave node and the master node at the start time of sending the second message, and
the time adjustment is determined by the slave node based on following elements including: the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance, and the second distance.

2. The system of claim 1, wherein the time adjustment is a time difference $\Delta t$ of the slave clock from the master clock and is calculated by the slave node using equations $$t_{RX}^M - t_{TX}^S = \frac{R_1}{c} + T_{RX}^M + T_{TX}^S + \Delta t, \; t_{RX}^S - t_{TX}^M = \frac{R_2}{c} + T_{TX}^M + T_{RX}^S - \Delta t,$$

the c being a speed of radio wave, tis being the start time of sending the first message on the slave clock of the slave node, $T_{TX}^S$ being the TX processing time of the first message calculated by the slave node, $t_{RX}^M$ being the receiving time of receiving the first message on the master clock of the master node, $T_{RX}^M$ being the RX processing time of the first message calculated by the master node, $t_{TX}^M$ being a start time of sending the second message on the master clock of the master node, $T_{TX}^M$ being the TX processing time of the second message calculated by the master node, $t_{RX}^S$ being the receiving time of receiving the second message on the slave clock of the slave node, $T_{RX}^S$ being the RX processing time of the second message calculated by the slave node, $R_1$ being the first distance between the slave node and the master node at the start time $t_{TX}^S$ calculated by the slave node, and $R_2$ being a second distance between the slave node and the master node at the start time $t_{TX}^M$ calculated by the slave node.

3. The system of claim 1, wherein the master node and the at least one slave node are configured to perform a UAS-based distributed cooperative beamforming (DCB) mission in a time-coordinated manner based on the time synchronization between the at least one slave node and the master node.

4. The system of claim 1, wherein the master node and the at least one slave node are configured to work together with radio frequency (RF) sensors and/or RF payloads to form a coherent beam on an area of interest (AOI) based on the time synchronization between the at least one slave node and the master node.

5. The system of claim 1, wherein the time adjustment is less than about 100 pico-seconds for the time synchronization of multiple distributed RF sources located on the at least one slave node and the master node in a GPS-denied environment.

6. The system of claim 1, wherein the master node and the at least one slave node are configured to randomly and spatially locate in a one-square mile area.

7. The system of claim 1, wherein the master node and the at least one slave node are configured to be in wireless communications.

8. The system of claim 1, wherein the time synchronization between the slave node and the master node is completed within about 21.73 μs.

9. The system of claim 1, wherein:
the TX processing time of the first message and the RX processing time of the second message are calculated by a field-programmable gate array (FGPA) of the slave node; and
the RX processing time of the first message and the TX processing time of the second message are calculated by the FGPA of the master node.

10. A method of enhanced multi-way time transfer for time synchronization between at least one slave node and one master node, wherein the method is implemented in a system comprising the at least one slave node each comprising an unmanned aerial system (UAS) and the one master node comprising one UAS, the method comprising:

sending, by one slave node of the at least one slave node, a first message to the master node to launch a time synchronization between the slave node and the master node, the first message including a start time of sending the first message on a slave clock of the slave node, and the slave node calculating a Transmit (TX) processing time of the first message;

upon receiving the first message, adding, by the master node, a receiving time of receiving the first message on a master clock of the master node to the first message to form a second message, the master node calculating a Receive (RX) processing time of the first message;

sending, by the master node, the second message back to the slave node, the second message including a start time of sending the second message on the master clock of the master node, and the master node calculating a TX processing time of the second message;

adding, by the slave node, a receiving time of receiving the second message on the slave clock of the slave node to the second message to form an updated message, the slave node calculating a RX processing time of the second message; and performing, by the slave node, a time adjustment to the slave clock of the slave node based on the updated message, thereby synchronizing time between the slave clock of the slave node and the master clock of the master node, wherein:

the slave node calculates a first distance between the slave node and the master node at the start time of sending the first message, and calculates a second distance between the slave node and the master node at the start time of sending the second message, and the time adjustment is determined by the slave node based on following elements including: the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance, and the second distance.

11. The method of claim 10, wherein the time adjustment is a time difference $\Delta t$ of the slave clock from the master clock and is calculated by the slave node using equations $$t_{RX}^M - t_{TX}^S = \frac{R_1}{c} + T_{RX}^M + T_{TX}^S + \Delta t, t_{RX}^S - t_{TX}^M = \frac{R_2}{c} + T_{TX}^M + T_{RX}^S - \Delta t,$$

the c being a speed of radio wave, $t_{TX}^S$ being the start time of sending the first message on the slave clock of the slave node, $T_{TX}^S$ being the TX processing time of the first message calculated by the slave node, $t_{RX}^M$ being the receiving time of receiving the first message on the master clock of the master node, $T_{RX}^M$ being the RX processing time of the first message calculated by the master node, $t_{TX}^M$ being a start time of sending the second message on the master clock of the master node, $T_{TX}^M$ being the TX processing time of the second message calculated by the master node, $t_{RX}^S$ being the receiving time of receiving the second message on the slave clock of the slave node, $T_{RX}^S$ being the RX processing time of the second message calculated by the slave node, $R_1$ being the first distance between the slave node and the master node at the start time $t_{TX}^S$ calculated by the slave node, and $R_2$ being a second distance between the slave node and the master node at the start time $t_{TX}^M$ calculated by the slave node.

12. The method of claim 10, wherein the master node and the at least one slave node are configured to perform a UAS-based distributed cooperative beamforming (DCB) mission in a time-coordinated manner based on the time synchronization between the at least one slave node and the master node.

13. The method of claim 10, wherein the master node and the at least one slave node are configured to work together with radio frequency (RF) sensors and/or RF payloads to form a coherent beam on an area of interest (AOI) based on the time synchronization between the at least one slave node and the master node.

14. The method of claim 10, wherein the time adjustment is less than about 100 pico-seconds for the time synchronization of multiple distributed RF sources located on the at least one slave node and the master node in a GPS-denied environment.

15. The method of claim 10, wherein the master node and the at least one slave node are configured to randomly and spatially locate in a one-square mile area.

16. The method of claim 10, wherein the master node and the at least one slave node are configured to be in wireless communications.

17. The method of claim 10, wherein the time synchronization between the slave node and the master node is completed within about 21.73 µs.

18. The method of claim 10, wherein:

the TX processing time of the first message and the RX processing time of the second message are calculated by a field-programmable gate array (FGPA) of the slave node; and the RX processing time of the first message and the TX processing time of the second message are calculated by the FGPA of the master node.

19. A non-transitory computer readable storage medium, storing instruction that, when being executed by one or more processors, causes the one or more processors to perform the method according to claim 10.

20. An event-driven simulation method of enhanced multi-way time transfer for time synchronization between at least one slave node and one master node, wherein the method is implemented in a system comprising the at least one slave node each comprising an unmanned aerial system (UAS) and the one master node comprising one UAS, the method comprising:

performing a first event, by one slave node of the at least one slave node, to launch an enhanced two-way time transfer every one millisecond at a local clock of the one slave node;

performing a second event, by the one slave node, to send a first message to the master node to launch a time synchronization between the one slave node and the master node, the first message including a start time of sending the first message on the local clock of the one slave node, and the one slave node calculating a Transmit (TX) processing time of the first message;

performing a third event, by the master node, to receive the first message through an antenna of the master node;

performing a fourth event, by the master node, to add a receiving time of receiving the first message on a master clock of the master node to the first message to form a second message, the master node calculating a Receive (RX) processing time of the first message;

performing a fifth event, by the master node, to send the second message back to the one slave node, the second message including a start time of sending the second message on the master clock of the master node, and the master node calculating a TX processing time of the second message;

performing a sixth event, by the one slave node, to receive the second message through an antenna of the one slave node; and performing a seventh event, by the one slave node, to add a receiving time of receiving the second message on the local clock of the one slave node to the second message to form an updated message, the one slave node calculating a RX processing time of the second message; and to perform a time adjustment to the local clock of the one slave node based on the updated message, thereby synchronizing time between the local clock of the one slave node and the master clock of the master node, wherein:

the one slave node calculates a first distance between the one slave node and the master node at the start time of sending the first message, and calculates a second distance between the one slave node and the master node at the start time of sending the second message, and the time adjustment is determined by the one slave node based on following elements including: the start time of sending the first message, the TX processing time of the first message, the receiving time of receiving the first message, the RX processing time of the first message, the start time of sending the second message, the TX processing time of the second message, the receiving time of receiving the second message, the RX processing time of the second message, the first distance, and the second distance.

* * * * *